US012198503B2

(12) United States Patent
Malik et al.

(10) Patent No.: US 12,198,503 B2
(45) **Date of Patent: *Jan. 14, 2025**

(54) GAMING MACHINE AND METHOD WITH HOLD AND SPIN SYMBOL PROPAGATION

(71) Applicant: Aristocrat Technologies Australia Pty Limited, North Ryde (AU)

(72) Inventors: Sahil Malik, New Delhi (IN); Shivangi Handa, New Delhi (IN)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/201,015

(22) Filed: May 23, 2023

(65) Prior Publication Data

US 2023/0290225 A1 Sep. 14, 2023

Related U.S. Application Data

(63) Continuation of application No. 17/359,002, filed on Jun. 25, 2021, now Pat. No. 11,704,974, which is a (Continued)

(51) Int. Cl.
*G07F 17/32* (2006.01)
*G07F 17/34* (2006.01)

(52) U.S. Cl.
CPC ...... *G07F 17/3267* (2013.01); *G07F 17/3209* (2013.01); *G07F 17/3213* (2013.01); (Continued)

(58) Field of Classification Search
None
See application file for complete search history.

(56) References Cited

U.S. PATENT DOCUMENTS 7,070,501 B2 7/2006 Cormack
8,360,851 B2 1/2013 Aoki
(Continued)

FOREIGN PATENT DOCUMENTS

AU 2013202658 A1 1/2014
AU 2013251288 A1 5/2014
(Continued)

OTHER PUBLICATIONS

Office Action dated Nov. 4, 2020 for U.S. Appl. No. 16/586,240 (pp. 1-8).

(Continued)

*Primary Examiner* — Ronald Laneau
(74) *Attorney, Agent, or Firm* — McAndrews, Held & Malloy, Ltd.

(57) ABSTRACT

A gaming machine, method, and non-transitory computer readable storage medium are disclosed, which permit a player to play a base game and a feature game that may be triggered or initiated through play of the base game. During play of the feature game, the gaming machine holds each instance of a feature trigger symbol in its respective feature game display position and, if a feature game has remaining spins, spins/respins reels to obtain replacement symbols for each feature game display position without the feature trigger symbol. If a newly-presented feature trigger symbol includes one or more directional components, the gaming machine propagates the new-presented feature trigger symbol in a direction or directions indicated by the one or more directional components.

20 Claims, 14 Drawing Sheets

Related U.S. Application Data continuation of application No. 16/586,240, filed on Sep. 27, 2019, now Pat. No. 11,055,965.

(52) U.S. Cl.
CPC ...... *G07F 17/3225* (2013.01); *G07F 17/3258* (2013.01); *G07F 17/34* (2013.01)

(56) References Cited

U.S. PATENT DOCUMENTS

| | | | | |
|---|---|---|---|---|
| 9,424,720 | B2 | 8/2016 | Suda | |
| 9,928,691 | B2 | 3/2018 | Olive | |
| 2003/0216165 | A1 | 11/2003 | Singer | |
| 2004/0137982 | A1 | 7/2004 | Cuddy | |
| 2006/0189369 | A1 | 8/2006 | Taylor | |
| 2007/0060248 | A1 | 3/2007 | Rodgers | |
| 2007/0129135 | A1 | 6/2007 | Marks | |
| 2009/0054129 | A1 | 2/2009 | Yoshimura | |
| 2009/0239634 | A1 | 9/2009 | Nguyen | |
| 2010/0075737 | A1 | 3/2010 | Bluemel | |
| 2010/0210343 | A1 | 8/2010 | Englman | |
| 2010/0234092 | A1 | 9/2010 | Gomez | |
| 2011/0250946 | A1* | 10/2011 | Finch | G07F 17/3244 463/20 |
| 2012/0178517 | A1 | 7/2012 | Montenegro | |
| 2013/0331168 | A1 | 12/2013 | Street | |
| 2014/0274292 | A1 | 9/2014 | Suda | |
| 2014/0323198 | A1 | 10/2014 | Tuck | |
| 2015/0310699 | A1 | 10/2015 | Meyer | |
| 2016/0042597 | A1 | 2/2016 | Olive | |
| 2016/0253873 | A1 | 9/2016 | Olive | |
| 2017/0148274 | A1 | 5/2017 | Olive | |
| 2017/0154498 | A1 | 6/2017 | Olive | |
| 2018/0218572 | A1 | 8/2018 | Caputo | |
| 2018/0268655 | A1 | 9/2018 | Olive | |
| 2019/0051113 | A1* | 2/2019 | Marks | G06F 7/582 |
| 2019/0073861 | A1* | 3/2019 | Gupta | G07F 17/3213 |
| 2020/0090467 | A1* | 3/2020 | Marks | G07F 17/3225 |
| 2020/0099467 | A1 | 3/2020 | Wang | |
| 2020/0111291 | A1 | 4/2020 | Pariseau | |
| 2020/0111312 | A1 | 4/2020 | Olive | |
| 2020/0152012 | A1 | 5/2020 | Olive | |
| 2020/0334958 | A1 | 10/2020 | Davis | |

FOREIGN PATENT DOCUMENTS

| | | | |
|---|---|---|---|
| AU | 2014202042 | A1 | 5/2014 |
| EP | 0984408 | | 3/2000 |

OTHER PUBLICATIONS

Notice of Allowance dated Mar. 16, 2021 for U.S. Appl. No. 16/586,240 (pp. 1-5).
Australian Examination Report for AU2016100230, dated May 11, 2016, 5 pages.
Australian Examination Report for AU2015210489, dated Jun. 14, 2016, 5 pages.
Australian Examination Report for AU2016202727, dated Jul. 4, 2016, 5 pages.
Australian Examination Report for AU2017101629, dated Jan. 16, 2018, 3 pages.
Australian Examination Report for AU2017204560, dated Feb. 1, 2018, 3 pages.
U.S. Appl. No. 16/455,166, filed Jun. 27, 2019, System and Method for Providing a Feature Game.
U.S. Appl. No. 16/555,684, filed Aug. 29, 2019, Gaming Machine With Column Specific Awards.
Australian Examination Report for AU2017101097, dated Dec. 7, 2017. (3 pages).
Office Action (Non-Final Rejection) dated Dec. 7, 2022 for U.S. Appl. No. 17/359,002 (pp. 1-9).
Office Action (Notice of Allowance and Fees Due (PTOL-85)) dated Mar. 22, 2023 for U.S. Appl. No. 17/359,002 (pp. 1-5).

* cited by examiner 510A 510B 510C 510D 510E

530

| Stop # | Reel 1 | Reel 2 | Reel 3 | Reel 4 | Reel 5 |
|---|---|---|---|---|---|
| 19 | | | C | | |
| 18 | | | C | | |
| 17 | | | B | | |
| 16 | A | | A | | |
| 15 | D | | G | | |
| 14 | E | A | F | | |
| 13 | F | C | D | | D |
| 12 | C | B | E | | B |
| 11 | D | A | C | D | C |
| 10 | B | E | D | D | A |
| 9 | C | D | A | C | B |
| 8 | A | C | B | B | D |
| 7 | B | A | B | D | E |
| 6 | A | B | C | C | F |
| 5 | A | A | B | D | A |
| 4 | B | B | C | A | B |
| 3 | A | C | C | B | D |
| 2 | C | A | A | E | E |
| 1 | B | B | C | E | C |
| 0 | B | B | A | D | E |

FIG. 5

GAMING MACHINE AND METHOD WITH HOLD AND SPIN SYMBOL PROPAGATION

RELATED APPLICATIONS

This application is a continuation application of U.S. patent application Ser. No. 17/359,002, filed Jun. 25, 2021, which is a continuation application of U.S. patent application Ser. No. 16/586,240, filed Sep. 27, 2019, the disclosures of which are hereby incorporated by reference herein in their entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each payline. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

SUMMARY

Per a first aspect of the disclosure, a gaming machine includes a credit input mechanism, a credit output mechanism, a player interface, a display device, a memory device, and a processor that executes instructions stored in the memory device. Execution of the instructions causes the processor to at least establish a credit balance on the gaming machine in response to the credit input mechanism receiving a physical item that provides a credit value, and initiate a play of the base game in response to input received from the player interface. During the play of the base game, execution of the instructions further causes the processor to at least cause first reels to spin and present first symbols at base game display positions on the display device, and trigger a play of a feature game in response to the first symbols including at least a threshold number of instances of a feature trigger symbol. During the play of the feature game, execution of the instructions further causes the processor to at least hold the instances of the feature trigger symbol that triggered the play of the feature game at feature game display positions on the display device, and cause second reels to spin and present second symbols at the feature game display positions that are without the feature trigger symbol. Execution of the instructions further causes the processor to propagate a first instance of the feature trigger symbol in the second symbols that is presented at a first feature game display position to one or more second feature game display positions by placing a respective instance of the feature trigger symbol in each of the one or more second feature game display positions, increase the credit balance based on each instance of the feature trigger symbol in the feature game display positions, and cause a pay out of credits from the credit balance via the credit output mechanism.

Per further aspects of the disclosure, execution of the instructions further causes the processor to propagate the first instance of the feature trigger symbol in a first direction as indicated by a first directional component of the first instance of the first trigger symbol.

Per yet other aspects of the disclosure, a method of operating a gaming machine is provided. The method includes establishing a credit balance on the gaming machine in response to a credit input mechanism of the gaming machine receiving a physical item that provides a credit value, and initiating a play of a game in response to input received from a player interface of the gaming machine. The method further includes spinning reels of the gaming machine to present symbols at display positions of a display device of the gaming machine. The method also includes selecting, based on a first directional component of a first instance of a configurable symbol that is presented at a first display position of the plurality of display positions, one or more second display positions that are positioned in a first direction, as indicated by the first directional component, from the first instance of a configurable symbol, and propagating the first instance of the configurable symbol by placing a respective instance of the configurable symbol in each of the one or more second display positions that is without the configurable symbol. The method further includes increasing the credit balance per a prize calculated based on each instance of the configurable symbol in the plurality of display positions, and causing a pay out from the credit balance via a credit output mechanism of the gaming machine.

Per certain aspects of the disclosure, a method of operating a gaming machine further includes selecting, based on a second directional component of the first instance of the configurable symbol, one or more third display positions that are positioned in a second direction, as indicated by the second directional component, from the first instance of a configurable symbol. Such method also includes further propagating the first instance of the configurable symbol by placing a respective instance of the configurable symbol in each of the one or more third display positions that is without the configurable symbol.

Per some aspects of the disclosure, a method of operating a gaming machine includes while holding respective instances of the configurable symbol at the plurality of display positions, spinning reels to present a second plurality of symbols at display positions that are without the configurable symbol. The method also includes selecting one or more third display positions from the plurality of display positions based on a second directional component of a second instance of the configurable symbol in the second plurality of symbols, and propagating the second instance of the configurable symbol by placing a respective instance of the configurable symbol in each of the one or more second display positions that is without the configurable symbol.

Per further aspects of the disclosure, a non-transitory computer readable storage medium is presented. The non-transitory computer readable storage medium includes instructions that, in response to being executed, causes a gaming machine to at least establish a credit balance on the gaming machine in response to a credit input mechanism of the gaming machine receiving a physical item that provides a credit value, and initiate a play of a game in response to input received from a player interface of the gaming machine. The instructions further cause the gaming machine to spin reels of the gaming machine to present first symbols at display positions of a display device of the gaming machine. The instructions also cause the gaming machine to spin, while holding, at the display positions, respective instances of a configurable symbol in the first symbols, the reels to present second symbols at any of the display positions that are without the configurable symbol. The instructions further cause the gaming machine to select, based on a first directional component of a first instance of the configurable symbol in the second symbols, one or more second display positions that are positioned in a first direction, as indicated by the first directional component, from the first instance of the configurable symbol, and propagate the first instance of the configurable symbol by incrementing a respective prize component of each respective instance of the configurable symbol in the one or more second display positions. The instructions also cause the gaming machine to increase the credit balance per a prize calculated based on the respective prize components for each instance of the configurable symbol in the plurality of display positions, and cause a pay out from the credit balance via a credit output mechanism of the gaming machine.

Per yet further aspects of the disclosure, a non-transitory computer readable storage medium comprises instructions, that in response to being executed, further cause a gaming machine to at least increment a respective prize component of each respective instance of the configurable symbol in the one or more second display positions and each respective instance of the configurable symbol in the one or more second display positions by a prize component of the first instance of the configurable symbol.

BRIEF DESCRIPTION OF THE DRAWINGS

FIG. 5 depicts exemplary reel strips suitable for selecting base game symbols and/or feature game symbols.

DETAILED DESCRIPTION

Figure 1:
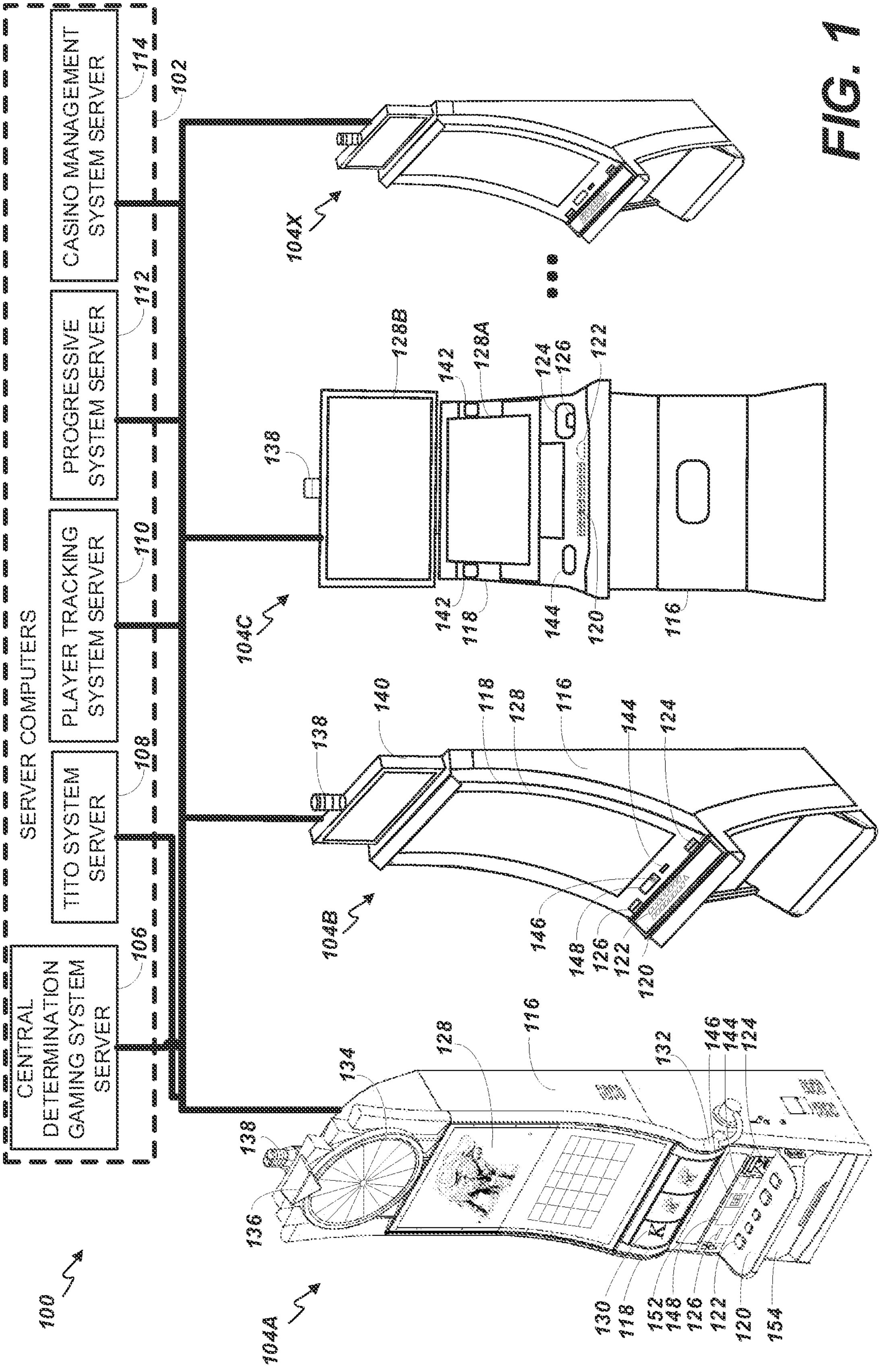
FIG. 1 is an exemplary diagram showing several EGMs networked with various gaming related servers.

The present disclosure generally relates to a hold and spin feature game in which certain trigger symbols (value symbols or configurable symbols) have a directional indicator in addition to a value component. When such a symbol is displayed in the hold and spin feature game, the trigger symbol propagates or expands into display positions in the direction indicated by its directional indicator. In some embodiments, the trigger symbol may replace symbols in the display positions into which it propagates with another instance of the trigger symbol. The new instances of trigger symbol may have a value that is based on the value of the trigger symbol with the directional indicator. In other embodiments, the trigger symbol may overlay or replace symbols in the display positions into which it expands in size. The expanded trigger symbol may retain the value it had prior to expanding in size. The expanded trigger symbol may provide its value to each display position into which it expands. A prize value may be awarded that is based on the values of the propagated and/or expanded trigger symbol. A jackpot prize may also be awarded if a threshold number of display positions are filled with the trigger symbols.

A gaming machine, method, and non-transitory computer readable storage medium are disclosed, which permit a player to play a base game and a feature game that may be triggered or initiated through play of the base game. During play of the base game, the gaming machine may select and display symbols of a base game outcome. The gaming machine may award prizes based on the symbols in the base game outcome. Further, if a trigger condition occurs such as, for example, the base game outcome including at least a threshold number of a feature trigger symbol, the gaming machine may trigger or initiate play of the feature game. The gaming machine may award an initial quantity of spins for the feature game, and may hold each instance of feature trigger symbol present in the base game outcome at a respective feature game display position.

During play of the feature game, the gaming machine holds each instance of a feature trigger symbol in its respective feature game display position and, if a feature game has remaining spins, spins/respins reels to obtain replacement symbols for each feature game display position without the feature trigger symbol. If a newly-presented feature trigger symbol includes one or more directional components, the gaming machine propagates the new-presented feature trigger symbol in a direction or directions indicated by the one or more directional components. Such propagation may cause the gaming machine to place further instances of the feature trigger symbol at feature game display positions that are positioned in the directions, as indicated by the directional components, from the propagating feature trigger symbol. In some embodiments, the gaming machine places instances of the feature trigger symbol that have the same common component and the same prize component as the feature trigger symbol being propagated, but without directional components. Besides placing additional instances of the feature trigger symbol, such propagation may also cause the gaming machine to increment prize components of instances of the feature trigger symbol that are already present in the direction(s) identified by directional components. In particular, the gaming machine may increment the prize components of such already-present feature trigger symbols by the prize component of the feature trigger symbol being propagated. Moreover, the gaming machine may award further spins in response to a spin adding additional instances of the feature trigger symbol to the feature game display positions Embodiments of the present disclosure represent an improvement in the art of electronic gaming machines and software for such electronic gaming machines. For example, at least some embodiments of the present disclosure provide a visual indication that signals to a player of the game as to how an instance of a feature trigger symbol will be propagated. In such embodiments, an instance of a feature trigger symbol may be displayed with a directional component which visually depicts a direction in which the feature trigger symbol will be propagated. As explained in greater detail herein, such instances of the feature trigger symbol may cause additional instances of the feature trigger symbol to be added to display positions that are positioned in a direction, as visually depicted by the directional component(s), from the propagating feature trigger symbol. Such instances of the feature trigger symbol may also cause incrementing and/or increasing prize components for existing instances of the feature trigger symbol that are positioned in a direction, as visually depicted by the directional component(s), from the propagating feature trigger symbol. Thus, embodiments of the present disclosure are not merely new game rules or simply new display patterns, but provide technologic improvements in the art of electronic gaming machines and software for such electronic gaming machines. Moreover, the above example is not intended to be limiting but merely exemplary of technologic improvements provided by some embodiments of the present disclosure. Technological improvements of other embodiments are readily apparent to those of ordinary skill in the art in light of the present disclosure.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming machines 104A-104X (EGMs, slots, video poker, bingo machines, etc.) that can implement one or more aspects of the present disclosure. The gaming machines 104A-104X may alternatively be portable and/or remote gaming devices such as, but not limited to, a smart phone, a tablet, a laptop, or a game console. Gaming machines 104A-104X utilize specialized software and/or hardware to form non-generic, particular machines or apparatuses that comply with regulatory requirements regarding devices used for wagering or games of chance that provide monetary awards.

Communication between the gaming machines 104A-104X and the server computers 102, and among the gaming machines 104A-104X, may be direct or indirect using one or more communication protocols. As an example, gaming machines 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming machines 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming machine such as gaming machine 104A, gaming machine 104B or any of the other gaming machines 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming machines 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming machines 104A-104X that utilize the game outcomes and display the results to the players.

Gaming machine 104A is often of a cabinet construction which may be aligned in rows or banks of similar devices for placement and operation on a casino floor. The gaming machine 104A often includes a service door 154 which provides access to the interior of the cabinet. Gaming machine 104A typically includes a button area or button deck 120 accessible by a player that is configured with input switches or buttons 122, an access channel for a bill validator 124, and/or an access channel for a ticket-out printer 126.

In FIG. 1, gaming machine 104A is shown as a Relm XL™ model gaming machine manufactured by Aristocrat® Technologies, Inc. As shown, gaming machine 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming machine 104A (e.g., in a cashless ticket ("TITO") system). In such cashless embodiments, the gaming machine 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming machine 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming machine 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming machine 104A. In such embodiments, a game controller within the gaming machine 104A can communicate with the player tracking system server 110 to send and receive player tracking information.

Gaming machine 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming machine 104A and may be activated by a player (e.g., using a switch or one of buttons 122) to indicate to operations staff that gaming machine 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming machines 104A have traditionally also included a handle 132 typically mounted to the side of main cabinet 116 which may be used to initiate game play.

Figure 2:
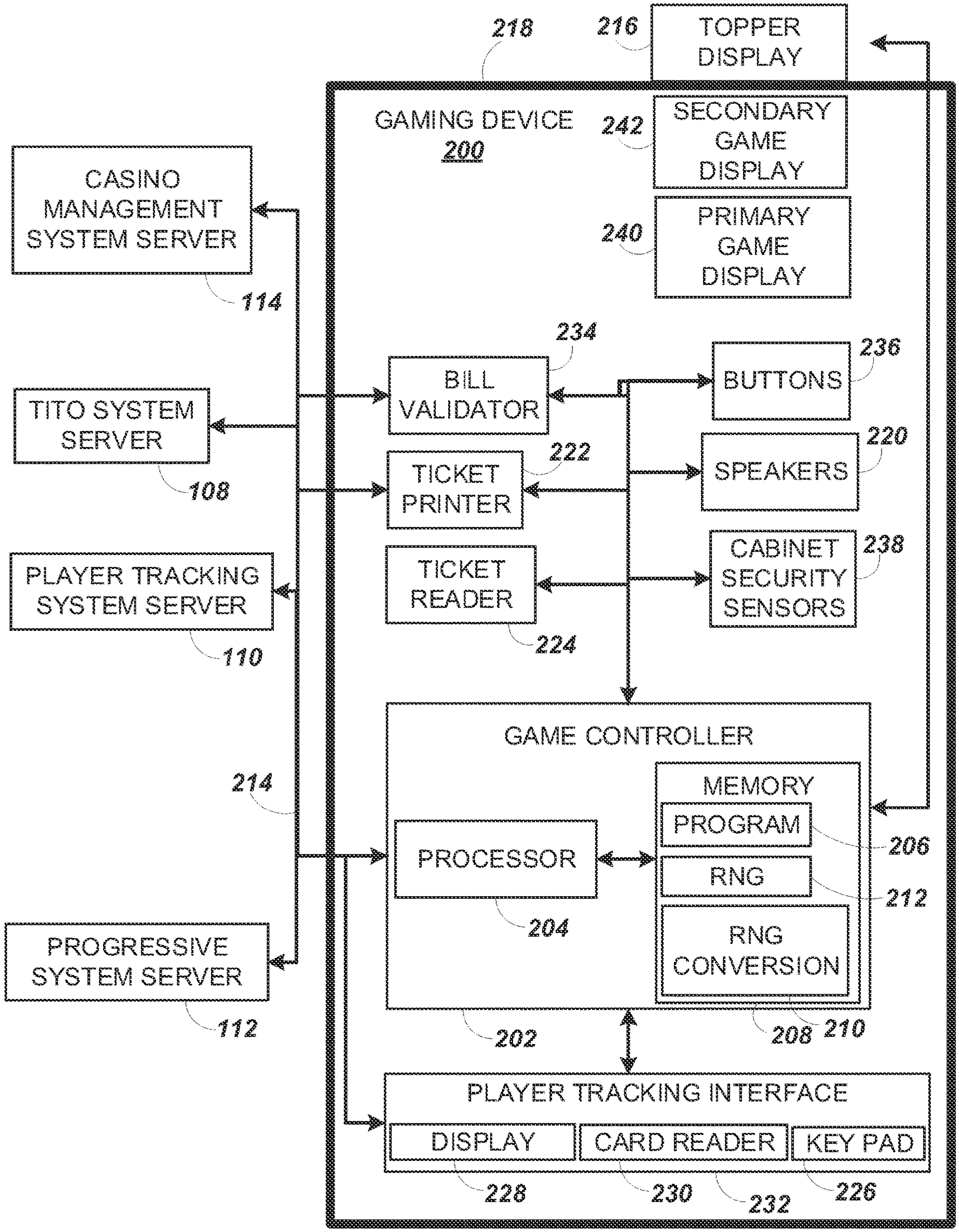
FIG. 2 is a block diagram showing various functional elements of an exemplary EGM.

Many or all the above described components can be controlled by circuitry (e.g., a gaming controller) housed inside the main cabinet 116 of the gaming machine 104A, the details of which are shown in FIG. 2.

An alternative example gaming machine 104B illustrated in FIG. 1 is the Arc™ model gaming machine manufactured by Aristocrat® Technologies, Inc. Note that where possible, reference numerals identifying similar features of the gaming machine 104A embodiment are also identified in the gaming machine 104B embodiment using the same reference numbers. Gaming machine 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming machine 104B.

Example gaming machine 104B includes a main cabinet 116 including a service door 154 which opens to provide access to the interior of the gaming machine 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming machine 104C shown is the Helix™ model gaming machine manufactured by Aristocrat® Technologies, Inc. Gaming machine 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming machine 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming machines 104A-104C and other similar gaming machines. Each gaming machine may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming machine 200 connected to various external systems. All or parts of the example gaming machine 200 shown could be used to implement any one of the example gaming machines 104A-X depicted in FIG. 1. As shown in FIG. 2, gaming machine 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming machine 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming machine 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming machine 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming machine 200 exchange with one or more remote gaming servers, such as a central determination gaming system server 106 (not shown in FIG. 2 but shown in FIG. 1). For purpose of this disclosure, the term "game instance" refers to a play or a round of a game that gaming machine 200 presents (e.g., via a user interface (UI)) to a player. The game instance is communicated to gaming machine 200 via the network 214 and then displayed on gaming machine 200. For example, gaming machine 200 may execute game program 206 as video streaming software that allows the game to be displayed on gaming machine 200. When a game is stored on gaming machine 200, it may be loaded from memory 208 (e.g., from a read only memory (ROM)) or from the central determination gaming system server 106 to memory 208.

Gaming machines, such as gaming machine 200, are highly regulated to ensure fairness and, in many cases, gaming machine 200 is operable to award monetary awards (e.g., typically dispensed in the form of a redeemable voucher). Therefore, to satisfy security and regulatory requirements in a gaming environment, hardware and software architectures are implemented in gaming machines 200 that differ significantly from those of general-purpose computers. Adapting general purpose computers to function as gaming machines 200 is not simple or straightforward because of: (1) the regulatory requirements for gaming machines 200, (2) the harsh environment in which gaming machines 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming machine 200 generally involves complying with a certain level of randomness. Typically, gaming jurisdictions mandate that gaming machines 200 satisfy a minimum level of randomness without specifying how a gaming machine 200 should achieve this level of randomness. To comply, FIG. 2 illustrates that gaming machine 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming machine 200 can be a Class II gaming machine where RNG 212 generates RNG outcomes for creating Bingo cards. In one or more embodiments, RNG 212 could be one of a set of RNGs operating on gaming machine 200. Game developers could vary the degree of true randomness for each RNG (e.g., pseudorandom) and utilize specific RNGs depending on game requirements.

Another regulatory requirement for running games on gaming machine 200 includes ensuring a certain level of RTP. Similar to the randomness requirement discussed above, numerous gaming jurisdictions also mandate that gaming machine 200 provides a minimum level of RTP (e.g., RTP of at least 75%). FIG. 2 illustrates that gaming machine 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming machine 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming machine 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming machine 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming machine 200.

During certain game events, the gaming machine 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming machine 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming machine (e.g., gaming machines 104A-104X and 200), the disclosure is not limited to those embodiments shown in FIGS. 1 and 2. For example, not all gaming machines suitable for implementing embodiments of the present disclosure necessarily include top wheels, top boxes, information panels, cashless ticket systems, and/or player tracking systems. Further, some suitable gaming machines have only a single game display that includes only a mechanical set of reels and/or a video display, while others are designed for bar counters or table tops and have displays that face upwards. Additionally, or alternatively, gaming machines 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming machine 104A by communicating with a player's smartphone (e.g., a digital wallet interface). Gaming machines 104A-104X and 200 may also include other processors that are not separately shown. Using FIG. 2 as an example, gaming machine 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
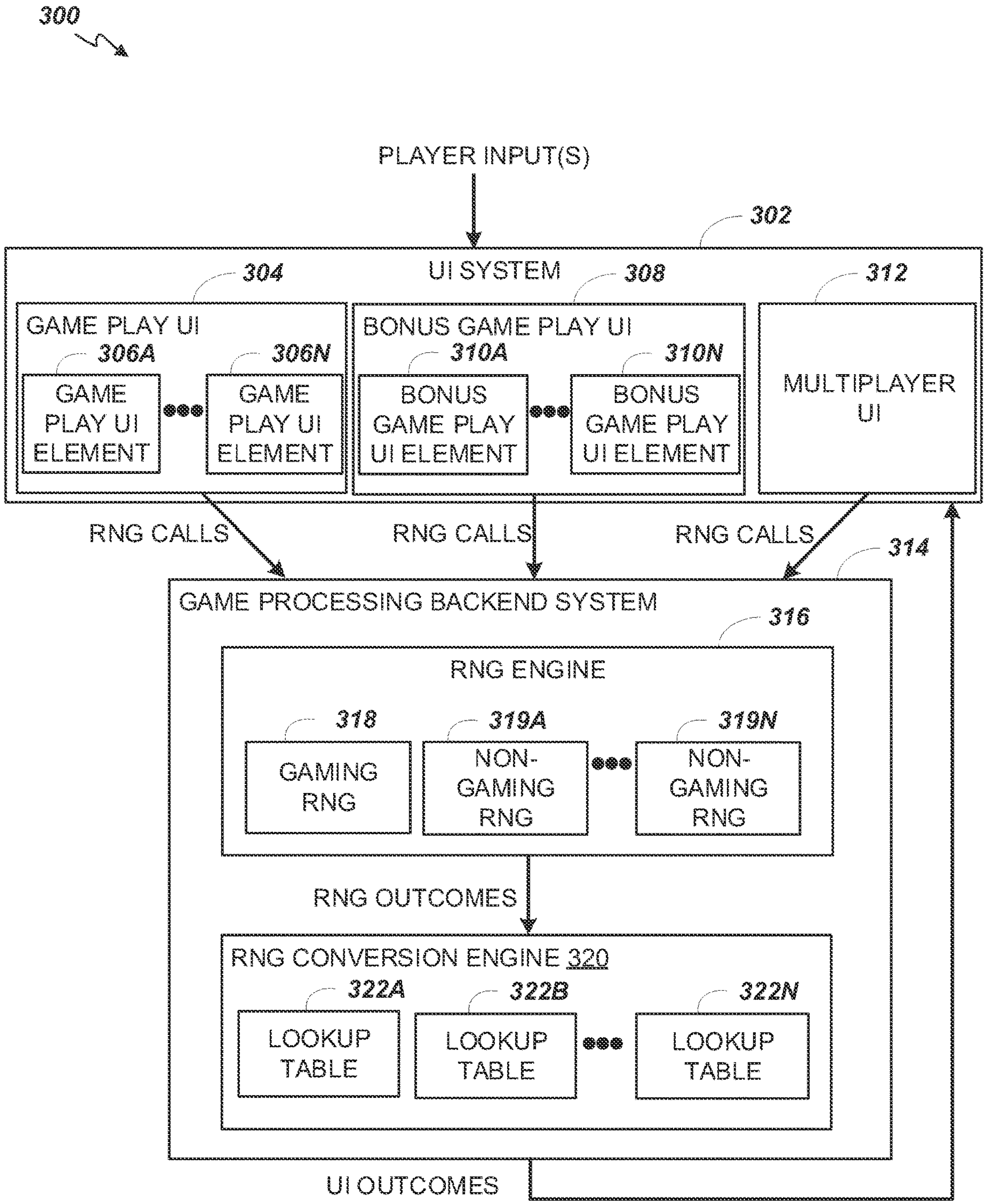
FIG. 3 illustrates, in block diagram form, an embodiment of a game processing architecture that implements a game processing pipeline for the play of a game in accordance with various embodiments described herein.

FIG. 3 illustrates, in block diagram form, an embodiment of a game processing architecture 300 that implements a game processing pipeline for the play of a game in accordance with various embodiments described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming machine, such as gaming machines 104A-104X and 200 shown in FIGS. 1 and 2, respectively. Alternatively, portions of the gaming processing architecture 300 can implement the game processing pipeline using a gaming machine and one or more remote gaming servers, such as central determination gaming system server 106 shown in FIG. 1.

The UI system 302 includes one or more UIs that a player can interact with. The UI system 302 could include one or more game play UIs 304, one or more bonus game play UIs 304, and one or more multiplayer UIs 306, where each UI type includes one or more mechanical UIs and/or graphical UIs (GUIs). In other words, game play UI 304, bonus game play UI 304, and the multiplayer UI 304 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more embodiments, at least some of the game play UI element 306A-306N are similar to the bonus game play UI elements 310A-310N. In other embodiments, the game play UI element 306A-306N can differ from to the bonus game play UI elements 310A-310N.

FIG. 3 also illustrates that UI system 302 could include a multiplayer UI 312 purposed for game play that differ or is separate from the typical base game. For example, multiplayer UI 302 could be set up to receive player inputs and/or presents game play information relating to a tournament mode. When a gaming machine transitions from a primary game mode that presents the base game to a tournament mode, a single gaming machine is linked and synchronized to other gaming machines to generate a tournament outcome. For example, multiple RNG engines 316 corresponding to each gaming machine could be collectively linked to determine a tournament outcome. To enhance a player's gaming experience, tournament mode can modify and synchronize sound, music, reel spin speed, and/or other operations of the gaming machines according to the tournament game play. After tournament game play ends, operators can switch back the gaming machine from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 corresponds to RNG 212 shown in FIG. 2. As previously discussed with reference to FIG. 2, gaming RNG 318 often performs specialized and non-generic operations that comply with regulatory and/or game requirements. For example, because of regulation requirements, gaming RNG 318 could be a cryptographic random or pseudorandom number generator (PRNG) (e.g., Fortuna PRNG) that securely produces random numbers for one or more game features. To generate random numbers, gaming RNG 318 could collect random data from various sources of entropy, such as from an operating system (OS). Alternatively, non-gaming RNGs 319A-319N may not be cryptographically secure and/or be computational less expensive. Non-gaming RNGS 319A-319N can, thus, be used to generate outcomes for non-gaming purposes. As an example, non-gaming RNGs 319A-319N can generate random numbers for such as generating random messages that appear on the gaming machine. The RNG conversion engine 320 processes each RNG outcome from RNG engine 316 and converts the RNG outcome to a UI outcome that is feedback to the UI system 302. With reference to FIG. 2, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming machine pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome to the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to the updating the appropriate UI, the player may subsequently provide additional player inputs to initiate a subsequent game instance that progresses through the game processing pipeline.

Figure 4A:
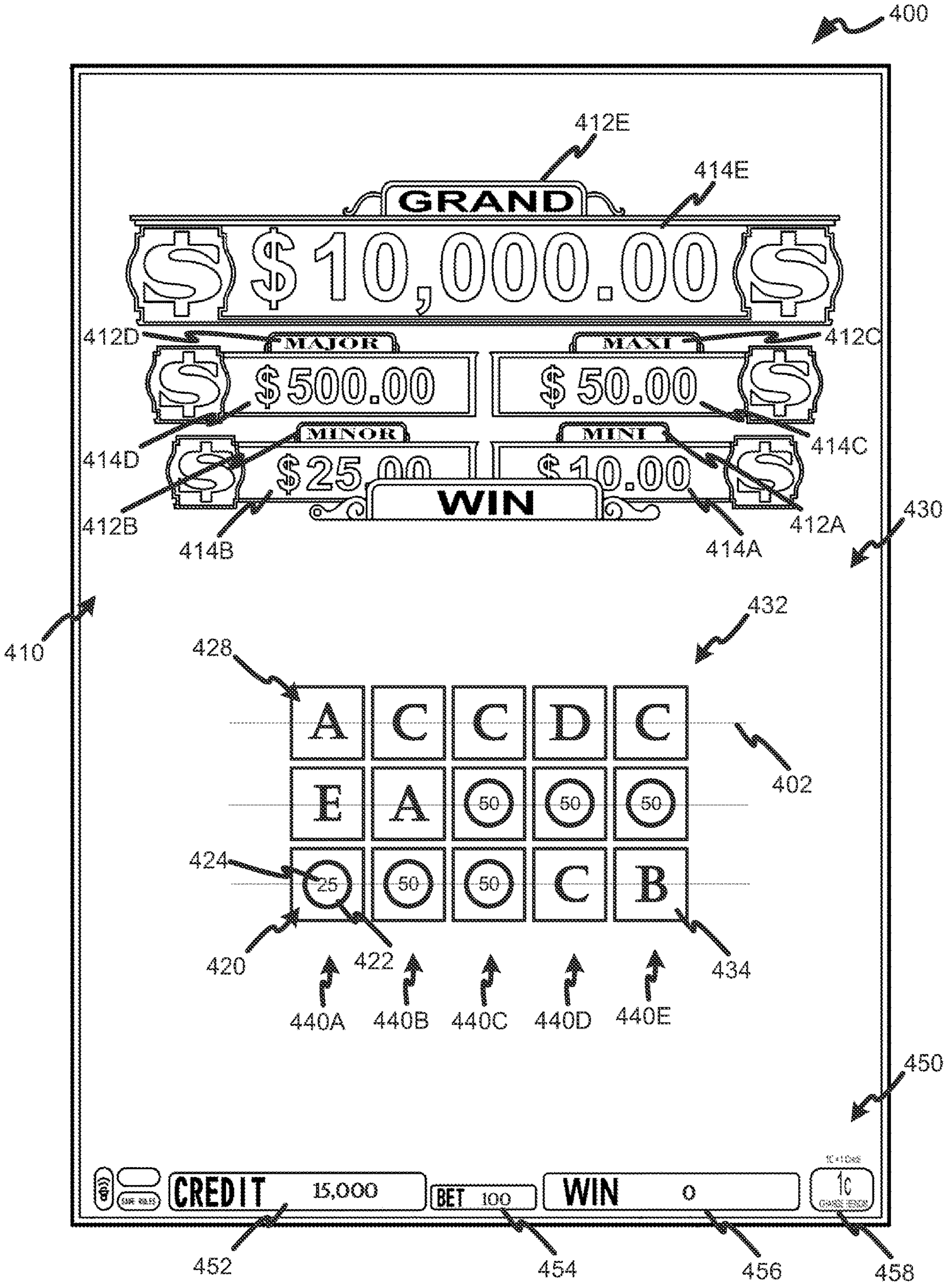
FIGS. 4A-4F depict base game screens and feature game screens for an example play flow.

In some embodiments, the gaming machine 200 may implement a slot-type or reel-type base game, play of which may trigger a slot-type or reel-type feature game as shown in FIGS. 4A-4F. In the interest of clarity, the following describes a play of a base game and a feature game of FIGS. 4A-4F as implemented by gaming machine 200. Each of gaming machines 104A-104X and/or the game processing architecture 300 may be utilized to implement the base game and/or feature of FIGS. 4A-4F via a similar manner. As shown in FIG. 4A, the gaming machine 200 may generate and present a base game screen 400 via display device 240. The base game screen 400 may include a prize display area 410 that identifies one or more prize indicia 412A-412E and the current prize value 414A-414E of prizes associated with such indicia. For example, as shown in FIG. 4A, the prize display area 410 may display a mini prize indicia 412A and mini prize value 414A, a minor prize indicia 412B and minor prize value 414B, a maxi prize indicia 412C and maxi prize value 414C, a major prize indicia 412D and major prize value 414D, and a grand prize indicia 412E and grand prize value 414E.

In some embodiments, one or all of the mini prize value 414A, the minor prize value 414B, the maxi prize value 414C, the major prize value 414D, and the grand prize value 414E may be implemented as progressive jackpots, as fixed bonus amounts that do not increment, or as a mixture of both. In one embodiment, the grand prize value 414E is implemented as a linked progressive jackpot, while the major prize value 414D is implemented as a standalone progressive (SAP) jackpot which only takes contributions from the gaming machine itself, incrementing the jackpot as a function of an amount of coin-in or wagers. In the same embodiment, the mini prize value 414A and the minor prize value 414B are implemented as fixed bonus amounts that are based on the initial bet wagered and increase as the wager amount increases. In some embodiments, the grand prize value 414E may also be implemented as a standalone progressive jackpot, or the major prize value 414D may be implemented as a linked progressive jackpot.

The base game screen 400 may further include a base game outcome area 430 via which the gaming machine 200 may present a base game outcome 432. To this end, the base game outcome area 430 may include one or more base game display positions 434 via which base game symbols of the base game outcome 432 are presented. In particular, the base game display positions 434 may be arranged in base game columns 440A-440E, resulting in the base game symbols of the base game outcome 432 being presented in the base game columns 440A-440E. The base game symbols of the base game outcome 432 may include instances of a feature trigger symbol 420 and one or more instances of non-feature trigger symbols 428.

The base game screen 400 may further include a status area 450 that provides various status information. For example, the status area 450 may provide a credit balance meter 452 that reflects the credit balance established on the gaming machine 200, an amount bet indicator 454 that reflects an amount bet on a play of the base game, a base game win meter 456 that reflects credits won from play of the base game, and a monetary denomination indicator 458 that reflects the monetary denomination associated with each credit.

Figure 4B:
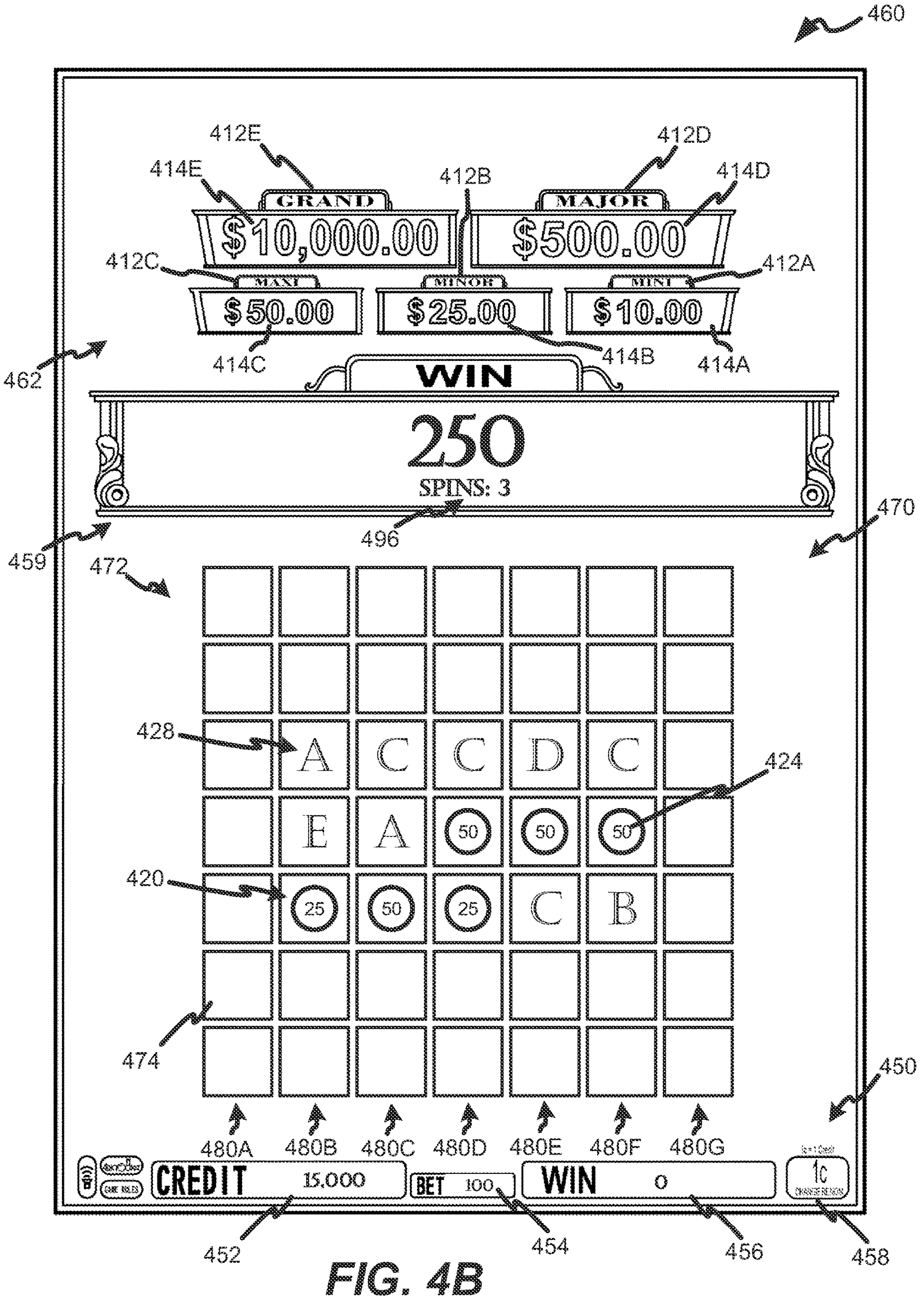
Figure 4C:
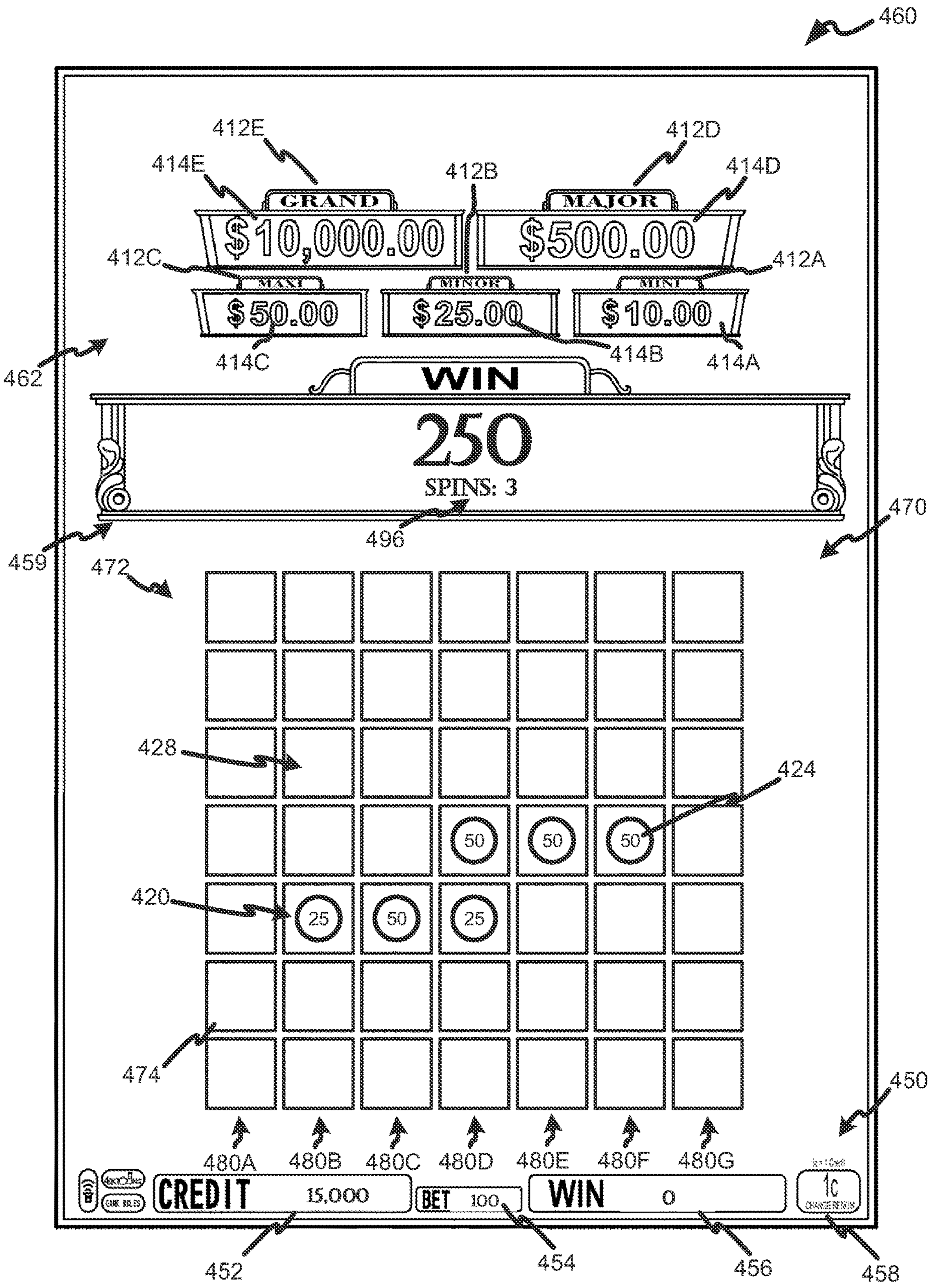

Besides the base game screen 400, the gaming machine 200 may generate and present a feature game screen 460 via display device 240. See, e.g., FIG. 4C. Similar to the base game screen 400, the feature game screen 460 may include a prize display area 462 that identifies one or more prize indicia 412A-412E and the current prize value 414A-414E associated with such indicia. For example, as shown in FIG. 4C, the prize display area 462 may display the mini prize indicia 412A and the mini prize value 414A, the minor prize indicia 412B and the minor prize value 414B, the maxi prize indicia 412C and the maxi prize value 414C, the major prize indicia 412D and the major prize value 414D, and the grand prize indicia 412E and the grand prize value 414D.

The feature game screen 460 may further include a feature game outcome area 470 via which the gaming machine 200 may present a feature game outcome 472. To this end, the feature game outcome area 470 may include one or more feature game display positions 474 via which feature game symbols of the feature game outcome 472 are presented. In particular, the feature game display positions 474 may be arranged in feature game columns 480A-480G, resulting in the feature game symbols of the feature game outcome 472 being presented in the feature game columns 480A-480G. The feature game symbols of the feature game outcome 472 may include instances of the feature trigger symbol 420 and one or more instances of the non-feature trigger symbols 428.

Like the base game screen 400, the feature game screen 460 may further include the status area 450. Via such status area, the feature game screen 460 may include the credit balance meter 452, the amount bet indicator 454, the base game win meter 456, and the monetary denomination indicator 458. In addition to the status area 450, the feature game screen 460 may further include a feature game win meter 459 via which the gaming machine 200 may indicate an amount won during play of the feature game.

The base game screen 400 and feature game screen 460 are depicted in FIGS. 4A-4F as having a different arrangement of display positions. Namely, the feature game screen 460 is shown as having a greater number of columns of display positions than the base game screen 400. Moreover, the feature game screen 460 is shown as having a greater number of rows of display positions as the base game screen 400. However, the base game screen 400 and the feature game screen 460 in some embodiments may be implemented such that base game screen 400 and the feature game screen 460 have the same number of columns, the same number of rows, and/or the same arrangement of display positions.

As noted above, the gaming machine 200 generates and displays the base game outcome 432 and the feature game outcome 472. To this end, the gaming machine 200 may spin reels associated with the base game columns 440A-440E, feature game columns 480A-480G, base game display positions 434, and/or feature game display positions 474. In at least one embodiment, each base game column 440A-440E has its own symbol-carrying reel that supplies its column of base game display positions 434 with base game symbols. Furthermore, each feature game display position 474 has its own symbol-carrying reel that supplies its feature game display position 474 with a feature game symbol.

In such an embodiment, as shown in FIG. 4A, the base game symbols of the base game screen 400 may provide a base game outcome 432 comprising base game symbols presented in a 3×5 matrix of display positions. In such an embodiment, the base game screen 400 may utilize five (5) symbol-carrying reels, a separate symbol-carrying reel for each column of display positions 434, to present base game symbols in the 3×5 matrix of display positions. As shown in FIG. 4C, the feature game symbols of the feature game screen 460 may provide a feature game outcome 472 comprising feature game symbols presented in a 7×7 matrix of display positions. In such an embodiment, the feature game screen 460 may utilize forty-nine (49) symbol-carrying reels, a separate symbol-carrying reel for each display position, to present feature game symbols in the 7×7 matrix of display positions.

In various embodiments, the number of reels per column may range between a single reel per column to up to a separate reel per display position. Thus, for the 3×5 base game outcome 432 of FIG. 4A, between three (3) and fifteen (15) reels may be used to provide the base game symbols. Likewise, for the 7×7 feature game outcome 472 of FIG. 4C, between seven (7) and forty-nine (49) reels may be used to provide the feature game symbols in various embodiments. Furthermore, while base outcome 432 and a feature game outcome 472 are depicted as respectively providing 3×5 and 7×7 arrays of display positions, embodiments may provide base game outcomes and/or feature game outcomes having a different arrangement (e.g., 3×3, 3×4, 4×5, 5×5, 5×8, 8×8, 3-4-3-4-3, etc.) of display positions. Moreover, as noted above, while the feature game outcome is depicted with different symbol arrangement than the base game outcome, the feature game outcome may have the same arrangement of symbols as the base game outcome in some embodiments.

Turning now to FIG. 5, details are presented regarding exemplary reel strips 510A-510E that the gaming machine 200 may use to generate the base game outcome 432 and/or feature game outcome 472. As shown, each exemplary reel strip 510A-510E provides an ordered set of game symbols 530. In the depicted embodiment, the predetermined symbol set consists of seven different game symbols 530, which are represented by different letters (e.g. A, B, C, D, E, F, G) for ease of illustration. However, other embodiments may utilize a predetermined symbol set consisting of a different number of game symbols 530. Moreover, the game symbols 530 may take on other shapes that may align with a particular theme of the gaming machine 200. Additionally, symbols represented by one or more letters on exemplary reel strips 510A-510E may be used as the feature trigger symbol 420.

As further shown, each reel strip 510A-510E may include an ordered symbol set consisting of a fixed number of game symbols 530 that are arranged in a predefined order. In some embodiments, each reel strip 510A-510E may include the same fixed number of game symbols 530. However, in the depicted embodiment, each reel strip 510A-510E may provide an ordered symbol set having a different fixed number of game symbols 530. The ordered symbol set of each reel strip 510A-510E may be predetermined, predefined, or randomly determined for one or more reel spins. Moreover, the gaming machine 200 may include multiple reel sets, wherein each reel set may comprise a different number of reel strips, carry different game symbols, specify a different order of game symbols, specify a different proportion of feature trigger symbols 420 to non-feature trigger symbols 428, etc. Furthermore, while the reel strips 510A-510E are depicted as a linear set of symbols, the game machine 200 utilizes the reel strips 510A-510E in a circular manner such that the first reel stop (e.g., reel stop 0 of reel strip 510A) is adjacent to the last reel stop (e.g., reel stop 16 of reel strip 510A).

Thus, the gaming machine 200 may generate a base game outcome 432 by assigning a reel strip to each reel of the base game and using the RNG 212 to randomly select a reel stop position for each assigned reel strip. The gaming machine 200 may then cause the display device 240 to spin base game symbols through the respective base game display position(s) 434 per the order specified by the assigned reel strip and stop the spinning of such base game symbols at the randomly selected reel stop position. Similarly, the gaming machine 200 may generate a feature game outcome 472 by assigning a reel strip to each reel of the feature game and using the RNG 212 to randomly select a reel stop position for each assigned reel strip. The gaming machine 200 may then cause the display device 240 to spin feature game symbols through the respective feature game display position(s) 474 per the order specified by the assigned reel strip and stop the spinning of such feature game symbols at the randomly selected reel stop position.

In some embodiments, sets of symbols and/or reel strips are stored in memory 208. Such symbols may include at least one feature trigger symbol 420 and a plurality of non-feature trigger symbols 428. In some embodiments, the feature trigger symbol 420 is implemented as a configurable symbol and the non-feature trigger symbols are implemented as non-configurable symbols. Per a configurable symbol implementation, the feature trigger symbol 420 includes a common component 422, a prize component 424, and zero or more directional components 426. See, e.g., FIGS. 4A and 4D. The prize component 424 may identify an award associated with the feature trigger symbol 420. For example, the prize component 424 may be a numeric value that specifies an award amount for the feature trigger symbol 420. For other instances, the prize component 424 may be a textual label that specifies a particular jackpot, progressive jackpot, or other award, such as an award amount. In some embodiments, a reel strip may include one or more instances of the feature trigger symbol 420 in which the prize component 424 and/or directional component 426 is fixed for that particular instance of the feature trigger symbol 420. In some embodiments, a reel strip may include one or more instances of the feature trigger symbol 420 in which the prize component 424 and/or directional component 426 is not-fixed for that particular instance of the feature trigger symbol 420. In such embodiments, the processor 204 may randomly select the prize component 424 and/or directional component 426 for each instance of the feature trigger symbol 420 before or after selecting a reel stop position for the reel strip.

Values for the prize components 424 may be determined using various different techniques. For example, multiple sets of reel strips may be stored in memory 208 and the values for the prize components 424 of one or more of such sets may be predefined. The processor 204 may then select a set of reel strips from the multiple sets of stored reel strips based on various criteria such as, for example, an amount bet, the selected denomination (1¢, 5¢, 10¢, etc.) of the game, whether a max bet was placed, a number of active paylines, a randomly generated number, etc. In some embodiments, one or more tables may be stored in the memory 208. The processor 208 may use one or more of such tables to generate the values for the prize components 424. Similar to the reel sets above, the processor 204 may select a table from the stored tables based on various criteria such as, for example, an amount bet, the selected denomination (1¢, 5¢, 10¢, etc.) of the game, whether a max bet was placed, a number of active paylines, a randomly generated number, etc. The selected table may provide a weighted table of multiplier values. In such an embodiment, the processor 204 may randomly select multiplier values from the table in a weighted manner (i.e., some multiplier values are more likely to be selected than others) and generate values for prize components 424 by multiplying a denomination value or a wager amount by the selected multiplier values. In other embodiments, the selected table may provide a weighted table of values. In such embodiments, the processor 204 may randomly select values from the table in a weighted manner (i.e., some values are more likely to be selected than others) and use the values selected from the table for the values of the prize components 424. Other techniques for generating or predefining the values of the prize components 424 are possible.

Examples of the feature trigger symbol 420 implemented as a configurable symbol are shown in FIGS. 4A-4F. As shown, the feature trigger symbol 420 includes a common component 422 depicted as circular object such as, for example, a coin or a pearl, a prize component 424 depicted as indicia overlaying the common component 422, and zero or more directional components 426 depicted as directional indicia such as, for example, arrows, pointers, lightning bolts, etc. that point in a specific direction. However, in some embodiments, the feature trigger symbol 420 may be implemented without a prize component 424 and/or a directional components 426. In the depicted embodiments of FIGS. 4A-4F, the indicia of the prize components 424 are numeric values directly indicative of a value or number of credits associated with the particular instance of the feature trigger symbol 420. In other embodiments, the indicia of the prize components 424 may indirectly indicate the value or number of credits of a prize associated with the particular instance of the feature trigger symbol 420. For example, the indicia may include textual labels such as "grand," "major," "maxi," "minor," or "mini" to indicate prizes whose values respectively correspond to current values 414A-414E for grand, major, maxi, minor, and mini progressive jackpot prizes.

The indicia of the prize components 424 may also take other forms. For example, a car icon or car textual label may indicate that the player has the opportunity to win or car or has won a car. In some embodiments, such indicia may indicate only a portion of a prize. Continuing with the car example, the car icon may be split into four portions, each portion being assigned to a different feature trigger symbol 420. In such embodiments, a game outcome must include all four portions of the car icon in order to win the car prize.

In one embodiment, numeric values of the prize components 424 may be generated by randomly selecting one of a plurality of predefined multipliers for each prize component 424 and applying the selected multiplier to an amount wagered on the base game to obtain the numeric value for the respective prize component 424. In such an embodiment, the multipliers may be randomly selected according to a weighted probability based at least in part on the amount wagered on the base game. In an embodiment, the processor 204 may assign the prize components 424 after the configurable symbols have been selected for display but before the display device 240 displays the selected configurable symbols. In another embodiment, the processor 204 may assign values to the configurable symbols after the display device 240 displays the configurable symbols.

In some embodiments, a predefined value and/or a jackpot value (e.g., values 414A-414E) may be randomly selected for a prize components 424. One or more of the jackpot prize 414A-414E may be implemented as a progressive award which accumulates over multiple plays of the base game and/or the feature game. As will be appreciated, the jackpot prizes may be funded from a variety of sources including funding from only plays of the gaming machine 200 itself, and/or funding from plays of a plurality of linked gaming machines 200. Furthermore, awarding of the jackpot prizes may be triggered by any means known in the art such as by using a mystery trigger.

In the depicted embodiments of FIGS. 4A-4F, the indicia of the directional components 426 are depicted as lightning bolts about a periphery of the common component 422. In one embodiment, the feature trigger symbols 420 during play of a base game do not include a directional component 426. As such, the feature trigger symbols 420 do not propagate during play of the base game. However, in some embodiments, the feature trigger symbols 420 may include zero or more directional components 426 during the base game. In such embodiments, the feature trigger symbols 420 of the base game may operate in a manner similar to the feature trigger symbols 420 of the feature game as explained below.

During play of a feature game, newly-displayed feature trigger symbols 420 may include zero or more directional components 426. Feature trigger symbols 420, which are newly-displayed during the feature game without a directional component 426, do not propagate during play of the feature game. However, feature trigger symbols 420, which are newly-displayed during the feature game with a directional component 426, propagate during play of the feature game. In particular, the feature trigger symbols 420 propagates in the directions identified by its directional components 426 by adding a feature trigger symbol 420 to each feature display position in the identified direction without a feature trigger symbol 420. In one embodiment, the added feature trigger symbols 420 are provided with the same common component 422 and the same prize component 424 as the feature trigger symbol 420 being propagated, but no directional components 426.

In one embodiment, instances of the feature trigger symbol 420 and their respective directional components 426 are fixed and predefined by reel strips for the feature game. In other embodiments, the reel strips for the feature game are populated with instances of the feature trigger symbol 420, but directional components 426 are randomly determined. In such an embodiment, the directional components 426 may be randomly selected according to a weighted probability based at least in part on the amount wagered on the base game. In particular, the processor 204 may assign zero or more directional components 426 to each instance of the feature trigger symbol 420 after the instances of the feature trigger symbol 420 have been selected for display but before the display device 240 displays the selected configurable symbols. In another embodiment, the processor 204 may assign zero or more directional components 426 to instances of the feature trigger symbols 420 after the display device 240 displays the instance of the feature trigger symbol. In such an embodiment, the processor 204 may cause the display device 240 to display such random selection via an animation. For example, an instance of the feature trigger symbol 420 may be initially populated with directional components 426 on the display device 240. The initially populated directional components 426 may flicker on and off and/or spin about the perimeter of the common component 422 of the feature trigger symbol in a manner similar to hands on clock. The processor 204 may then stop the directional components 426 in a randomly selected orientation and remove any extra directional components 426. Other techniques for presenting and/or animating the directional components 426 are possible and contemplated.

Figure 6A:
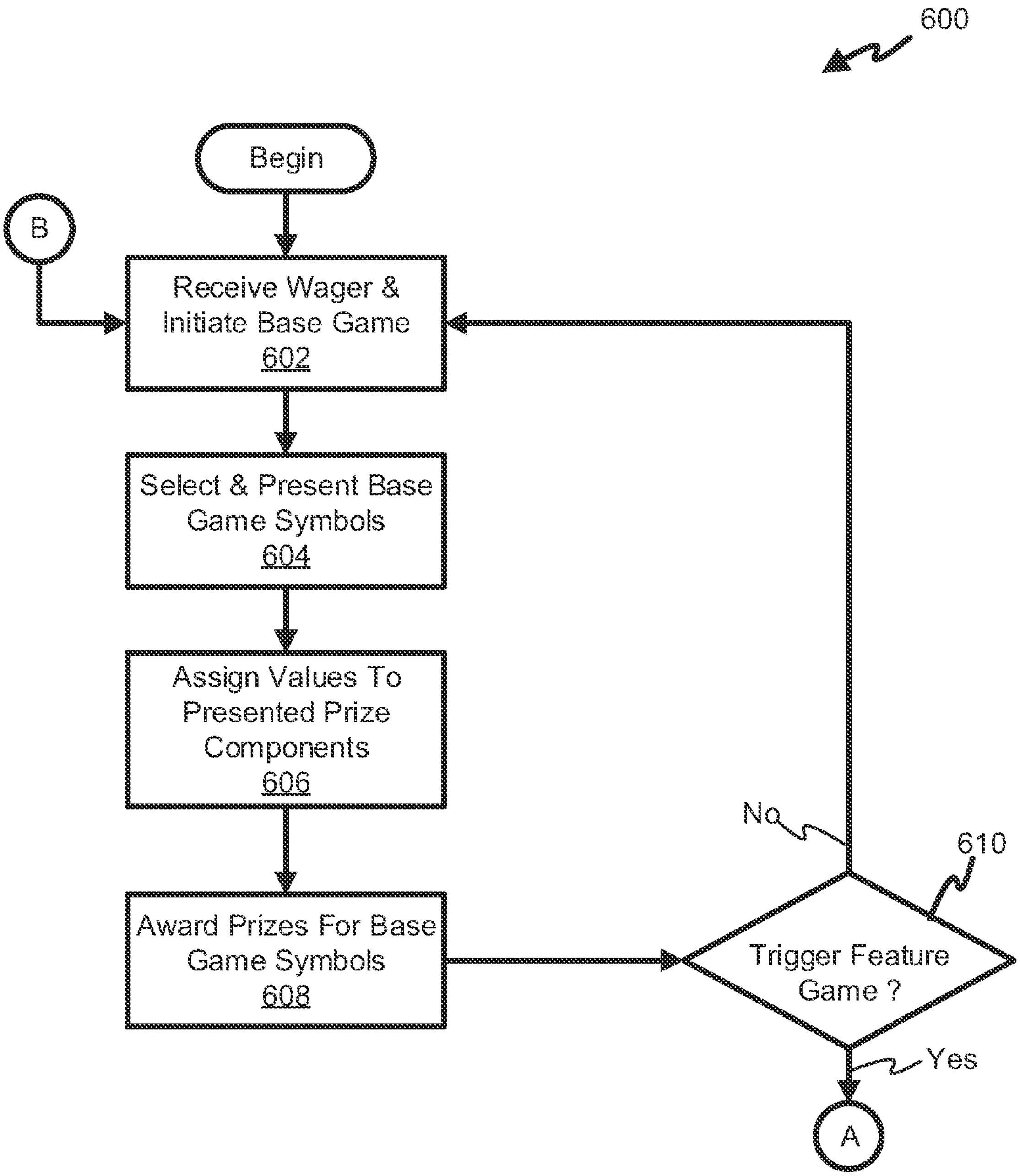
FIGS. 6A and 6B depict a flowchart for an exemplary method of operating a gaming machine per play of a base game and a feature game.
Figure 6B:
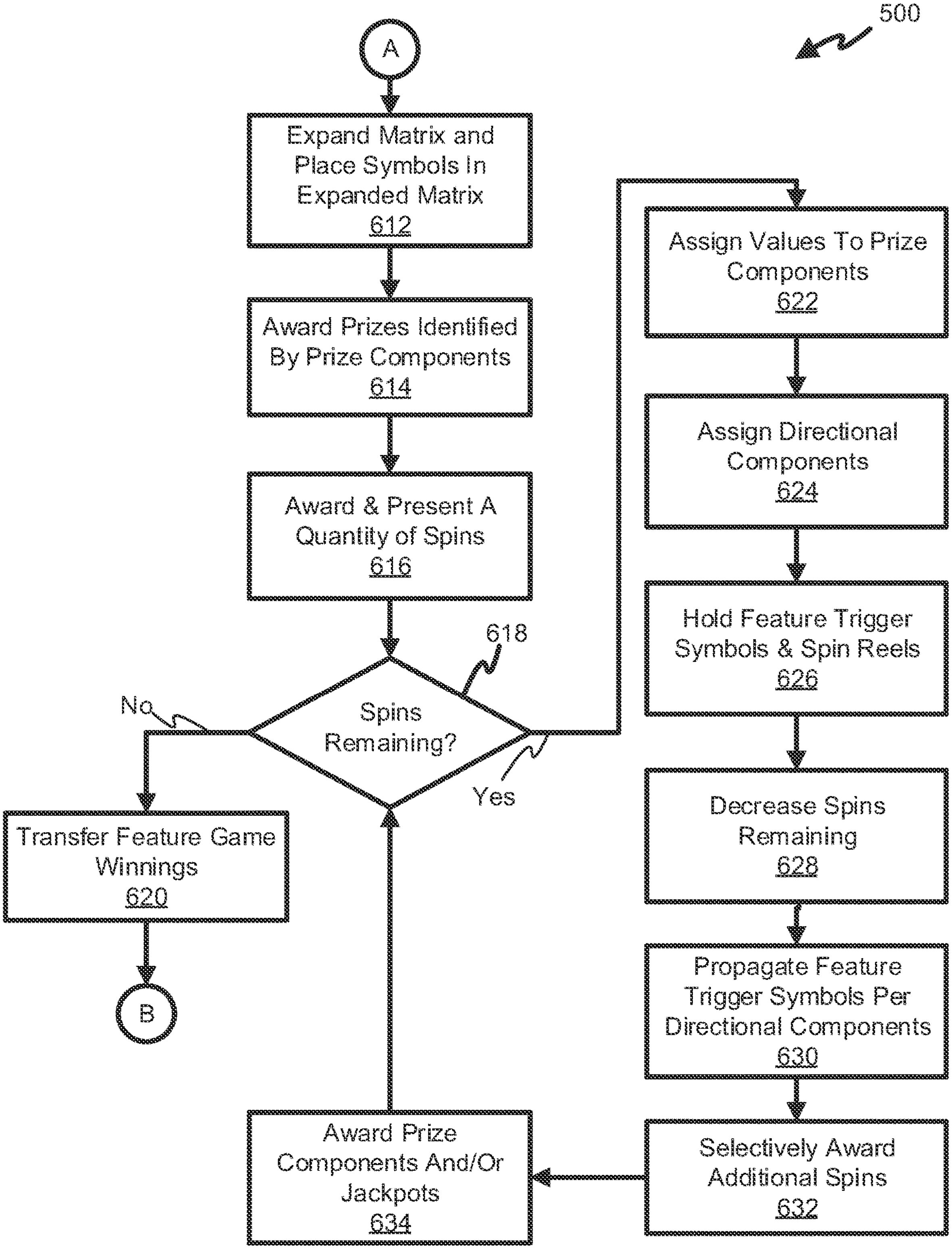

Referring now to FIGS. 6A and 6B, details regarding a gaming machine and a process of operating such gaming machine are described. In particular, a flowchart is depicted in FIGS. 6A and 6B, which illustrate a general flow of a method 600 of operating a gaming machine, in according with one or more embodiments described herein. In the interest of clarity, the method 600 is described from the standpoint of gaming machine 200 of FIG. 2. However, it should be appreciated that the method 600 may be implemented in a similar manner by gaming machines 104A-104X of FIG. 1 or game processing architecture 300 of FIG. 3. In various embodiments, the method 600 is executed by a processor, such as processor 204.

At a high-level, the gaming machine 200 per the method 600 permits a player to play a base game and a feature game that may be triggered or initiated through play of the base game. During play of the base game, the gaming machine 200 may select symbols for a base game outcome 432 and display the symbols of the base game outcome 432. The gaming machine 200 may award prizes based on the symbols in the base game outcome 432, such as by evaluating symbols in the base game outcome against a paytable to determine if winning symbol combinations exist. If a trigger condition occurs such as, for example, the base game outcome 432 including at least a threshold number (e.g., four (4), five (5), six (6), etc.) of a feature trigger symbol 420, the gaming machine 200 triggers or initiates play of the feature game. In some embodiments, the gaming machine 200 awards an initial quantity of spins for the feature game, and holds each feature trigger symbol 420 of the base game outcome 432 at a respective feature game display position 474. In some embodiments, the initial quantity of spins may be a single spin and the feature game may consists of a single spin of the reels. In other embodiments, the gaming machine 200 may award additional spins for certain feature game outcomes (e.g., a newly-presented feature trigger symbol 420) and/or award a larger initial quantity of spins (e.g. three (3), ten (10), etc.)

During play of the feature game, the gaming machine 200 holds each feature trigger symbol 420 from the base game outcome 432 that triggered the play of the feature game in its respective feature game display position 474 and, if a feature game has remaining spins, spins/respins reels to obtain replacement symbols for each feature game display position 474 without the feature trigger symbol 420. If a newly-presented feature trigger symbol 420 includes one or more directional components 426, the gaming machine 200 propagates the new-presented feature trigger symbol 420 in a direction or directions indicated by the one or more directional components. Such propagation may cause the gaming machine 200 to add further feature trigger symbols 420 at feature game display positions 474 positioned in the directions indicated by the directional components 426. In some embodiments, the gaming machine 200 adds feature trigger symbols 420 having the same common component 422 and the same prize component 424 as the feature trigger symbol 420 being propagated, but without directional components 426. Besides adding additional feature trigger symbols 420, such propagation may also cause the gaming machine 200 to increment prize components 424 of feature trigger symbols 420 that are already present in the direction(s) identified by directional components 428. In particular, the gaming machine 200 may increment the prize components 424 of such already-present feature trigger symbols 420 by the prize component 424 of the feature trigger symbol 420 being propagated. Moreover, the gaming machine 200 may award further spins in response to a spin adding additional feature trigger symbols 420 to the feature game display positions 474. Such increment may be by a fixed amount (e.g., one (1), two (2), etc.). The increment may alternatively be set equal to the initial quantity of spins awarded (e.g., the gaming machine 200 may initially award three (3) spins and increment by three (3) spins). In yet another embodiment, the gaming machine 200 may increment or reset the number of remaining spins to the initially awarded quantity of spins. In further embodiments, the gaming machine 200 may determine the increment based on a base game and/or feature game outcome.

Turning now to the flowchart of FIGS. 6A and 6B, the gaming machine 200 at 602 may receive input that specifies a wager on a base game. The gaming machine 200 may further receive input that initiates play of the base game. For example, a player via the player interface of the gaming machine 200 may specify a number of credits of an established credit balance to wager on play of the base game. Further, the player, via the player interface (e.g., pressing a button 236, pulling a handle, touching a touch screen, etc.), may initiate play of the base game.

At 604, the processor 204 of the gaming machine 200 may select base game symbols for a base game outcome 432 and cause the primary game display device 240 to display the base game symbols of the base game outcome 432 at respective base game display positions 434. See, e.g., FIG. 4A. As explained above, the processor 204 may select the symbols of the base game outcome 432 by randomly selecting reel stop positions for each base game reel and its respective base game reel strip. The processor 204 at 606 may further assign values to prize components 424 of any displayed feature trigger symbols 420. As explained above, the processor 204 in some embodiments may assign values to prize components 424 prior to displaying the base game symbols at 604.

The processor 204 at 608 may determine whether the base game outcome 432 includes any winning symbol combinations along an activate payline 402. For each such winning symbol combination, the processor 204 may award a prize associated with the winning symbol combination.

At step 610, the processor 204 may determine whether a feature trigger event has occurred. In some embodiments, the processor 204 may determine that the trigger event has occurred if a base game outcome 432 includes at least a threshold number (e.g., six (6)) of instances of the feature trigger symbol 420. See, e.g., FIG. 4A which depicts a base game outcome that includes six (6) instances of the feature trigger symbol 420 and thus a feature trigger event for a particular embodiment. In some embodiments, the processor 204 may detect the occurrence of a feature trigger event based on other factors such a randomly generated number, amount of coin-in received since the last trigger, a progressive jackpot amount, etc.

If a feature trigger event has not occurred, the processor 204 may return to 602 to continue play of the base game. However, if a feature trigger event has occurred, the processor 204 may initiate the feature game. In particular, the processor 204 at 612 (See, e.g., FIG. 6B.) may expand the field or matrix of display positions and place the feature trigger symbols 420 of the base game outcome 432 in corresponding feature game display positions 474 of the feature game outcome 472. For example, as shown FIGS. 4A and 4B, the processor 204 may expand the 3×5 matrix of base game display positions 434 of FIG. 4A into the 7×7 matrix of feature game display positions 474. In some embodiments, the processor 204 may animate such expansion such that the 3×5 matrix of FIG. 4A appears to "grow" taller and wider into the 7×7 matrix of FIG. 4B. For example, rows and/or columns of additional feature game display positions 474 may be added uniformly around the base game positions 434 as depicted in FIG. 4B or may be added in one or more directions from the matrix of base game positions 434 (e.g., up; down; left; right; up and left; up and right; down and left; down and right, etc.) As shown, the larger matrix of the feature game outcome 472 may include the smaller matrix of the base game outcome 432. As such, the base symbols of the base game outcome 432 may essentially remain in place and occupy corresponding feature game display positions 474 of the feature game outcome 472. However, such a direct mapping between base game display positions 434 and feature game display positions 474 is not required by some embodiments and a less direct or even random mapping of base game display positions 434 to feature game display positions 474 may be used. Moreover, the non-feature trigger symbols 428 may be removed, dimmed, made transparent (e.g., ghosted) to further highlight the retain feature trigger symbols 428. See, e.g., FIGS. 4B and 4C.

In response to initiating the feature game, the processor 204 at 614 may award prizes identified by the prize components 424 of any feature trigger symbol 420. In one embodiment, the processor 204 adds such prizes to the feature game win meter 459. For example, the feature game win meter 459 of FIG. 4B has a value of 250 credits, which is the sum of the numeric values provided by the prize components 424 of the displayed feature trigger symbols 420. In some embodiments, the processor 204 may delay awarding prizes identified by the prize components 424 until after an initial spin of the feature game.

The processor 204 at 616 may award a quantity of spins to the feature game. For example, the processor 204 may award a player of the gaming machine 200 with a predetermined quantity (e.g. three (3)) of spins to use during play of the feature game. In some embodiments, the quantity of spins awarded is based on the quantity of feature trigger symbols in the base game outcome 432. For example, if there are six or seven instances of the feature trigger symbol 420 in the base game outcome 432, then a first quantity (e.g., three (3)) of spins is awarded, if there are eight of nine instances of the feature trigger symbol 420 in the base game outcome 432, then a second quantity (preferably larger, but can be smaller) of feature spins is awarded. In certain embodiments, the quantity is based on a wager amount. For a first wager amount or set of wager amounts, a first quantity is awarded and for a second wager amount (usually higher than the first) or set of wager amounts, a second quantity (usually higher than the first) is awarded. Other combinations of spin award quantities are possible and contemplated.

At 616, the processor 204 may further cause the display device 240 to display a spins indicia or counter 496 that identifies the quantity of spins awarded and thus also identify the quantity of spins remaining for the feature game. For example, as shown in FIG. 4B, the processor 204 may update the spin indicia 496 of feature game to indicate that three (3) spins were awarded to the feature game.

At 618, the processor 204 determines whether the spin indicia 496 indicates that the feature game has remaining spins. If the feature game has no remaining spins, the processor 204 at 618 may determine that the feature game is over or completed and may reflect such status to player. In response to the feature game ending, the processor 204 at 620 may transfer credits of the feature game win meter 459 and the base game win meter 456 to the credit balance meter 452. After updating the meters, the processor 204 may return to 602 in order to permit the player to place a wager on another play of the base game.

However, if processor determines at 618 that the feature game has spins remaining, the processor 204 may assign values and zero or more directional components to feature trigger symbols 420 of reel strips prior to spinning the feature game reels, selecting symbols to be displayed at the feature symbol display positions, and/or displaying the replacement symbols. Accordingly, the processor 204 at 622 may assign values to prize components 424 of any replacement symbol that is an instance of the feature trigger symbol 420. Moreover, the processor 204 at 624 may assign zero or more directional components 426 to any replacement symbol that is an instance of the feature trigger symbol 420. In other embodiments, the processor 204 may assign values and zero or more directional components after spinning the feature game reels and/or displaying the replacement symbols.

In certain embodiments, certain (up to all) reel strips used for the play of the feature game may have fixed feature trigger symbols. Some or all of these fixed feature trigger symbols may have values assigned to them. Alternatively, some or all of these fixed feature trigger symbols may have no values assigned to them and may be selected as described herein. In some embodiments, some or all of the fixed feature trigger symbols may have directional components assigned to them. Alternatively, some or all of the fixed feature trigger symbols may be designated as directional feature symbols but may not have directional components assigned to them and may be selected as described herein.

In certain embodiments, reel strips that are used for selecting symbols for the play of the feature game may have certain symbols designated as feature symbols. Some of those may be designated as having value components only, some of those may be designated as having value components along with directional components. For each spin or play of the feature game, the values and/or directions to be assigned to each of those symbols may be determined by processor 204 in accordance with the present disclosure.

Figure 4D:
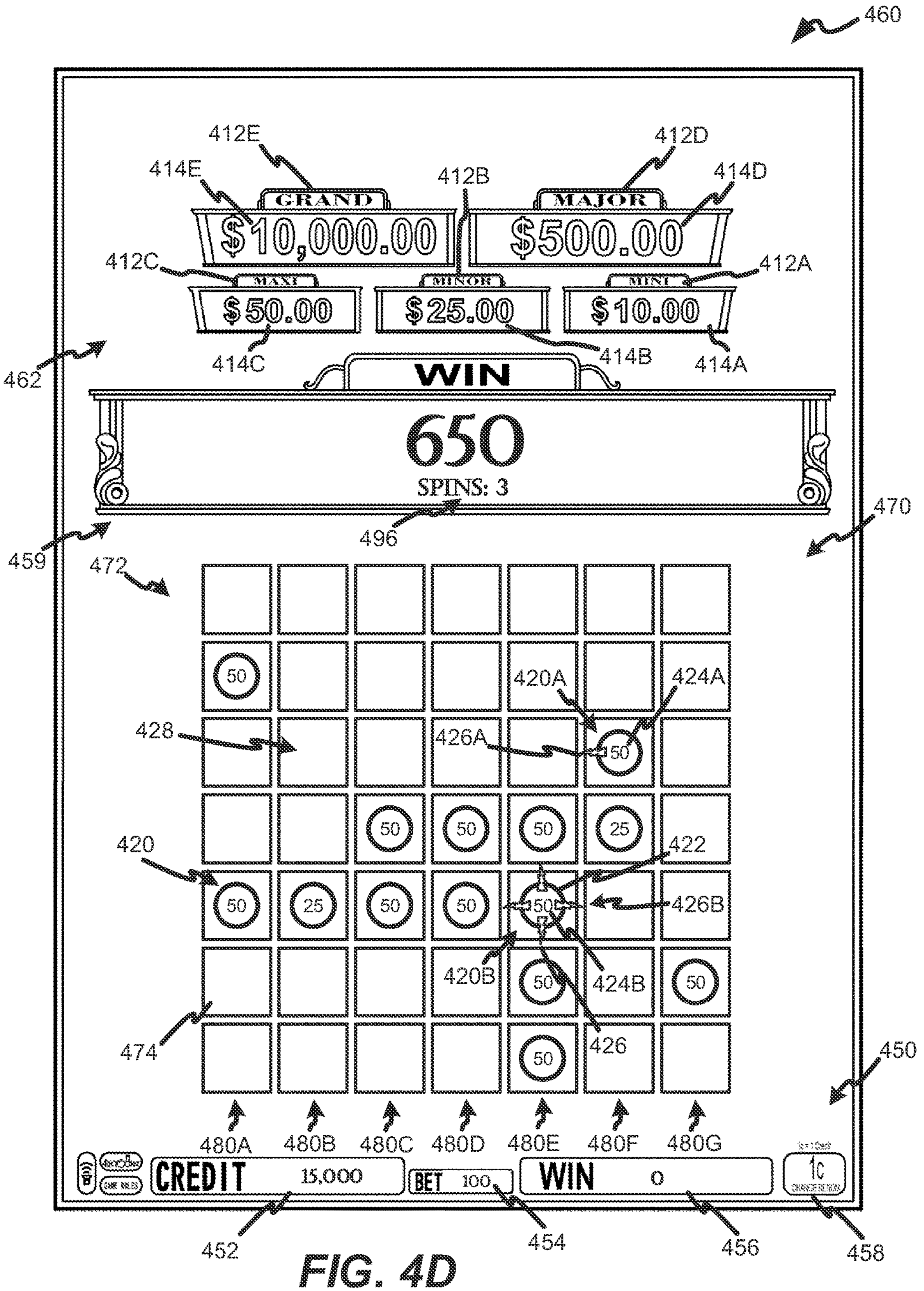

The processor 204 at 626 may hold any feature trigger symbols 420 in its respective feature game display position 474 and select replacement symbols for each feature game display positions that does not include a feature trigger symbol 420 or that includes a non-feature trigger symbol 428. The processor 204 may further cause the primary game display device 240 to display the replacement symbols at respective feature game display positions 474. As shown in FIG. 4D, the processor 204 may cause the display device 240 to present any replacement symbols that are non-feature trigger symbols 428 as a dimmed, transparent, ghosted, blank, or otherwise de-emphasized symbols in order to bring further attention to any replacement symbols that are feature trigger symbols 420.

As explained above, the processor 204 may select the replacement symbols of the feature game outcome 472 by randomly selecting reel stop positions for each feature game reel and its respective feature game reel strip. In one embodiment, the processor 204 selects the replacement symbols using feature game reel strips that include a full set of feature game symbols. In other embodiments, the feature game reel strips may include a reduced set of feature game symbols that take into account the already held feature trigger symbols 420. In an alternative embodiment, the feature game reel strips may provide an increased set of feature game symbols. For example, a feature trigger symbol 420 may be purchased or otherwise awarded to the feature game reel strips prior to initiating the feature game.

At 628, the processor 204 may decrease the quantity of spins for the feature game and update the spin indicia 496 to reflect the decreased quantity of spins remaining for the feature game. In one embodiment, the processor 204 may decrease the quantity of spins by a fixed decrement amount (e.g. 1). However, the processor 204 may decrease the quantity of spins remaining by any desired amount. For example, the decrement amount may be dependent upon a particular non-feature trigger symbol 428 selected as a replacement symbol.

The processor 204 at 630 may propagate instances of the feature trigger symbol 420 per their respective directional components. As explained in greater detail below with respect to FIGS. 4A-4F, propagation of an instance of the feature trigger symbol 420 may result in (i) additional instances of the feature trigger symbol 420 being placed in feature game display positions 474 that are without a feature trigger symbol 420, and/or (ii) prize components 424 for instances of the feature trigger symbol 420 being incremented. The feature game display positions 474 to which instances are placed and/or prize components 424 are incremented are selected based on directional components 426 of the instance being propagated. For example, if a directional component 426 points left, the processor 204 may select one or more feature game display positions 474 that are positioned to the left of the instance being propagated.

The processor 204 at 632 may selectively award additional spins. In one embodiment, the processor 204 awards additional spins to the feature game in response to a replacement symbol for the respective column being an instance of the feature trigger symbol 420. However, in some embodiments, the processor 204 may elect to award additional spins to the feature game based on other criteria such as, for example, a feature trigger symbol with a directional component, a mystery trigger, a random trigger, a particular non-feature trigger symbol 428, etc.

If additional spins are awarded, then the processor 204 at 632 may increase the quantity of spins for the feature game and update the spin indicia 496 to reflect the increased quantity of spins remaining for the feature game. In one embodiment, the processor 204 may increase the quantity of spins by a fixed increment amount (e.g. 1). In some embodiments, the processor 204 may increase the quantity of spins by resetting the quantity of spins to its initially awarded value. For example, if the feature game was initially awarded three (3) spins, the processor 204 may reset the quantity of spins of remaining spins to three (3). In some embodiments, the processor 204 may not increase the quantity of spins, regardless of whether an additional instance of the feature trigger symbols 420 is selected as a replacement symbol.

At 634, the processor 204 may update the feature game win meter 459 based on the values assigned to the prize components 424 and any awarded jackpot prizes 414A-414E. In one embodiment, the processor 204 may determine that a jackpot prize 414A-414E is to be awarded when the feature game outcome 372 includes at least a threshold number of instances of the feature trigger symbol 420. For example, the processor 204 may determine to award the grand jackpot prize 414E when the feature game outcome 472 includes a number of instances of the feature trigger symbol 420 equal to the number of feature game display positions 474. In other embodiments, the threshold number may be less than the number of feature game display positions 474. For example, the processor 204 may determine to award the grand jackpot prize 414E when at least forty-eight (48) of the forty-nine (49) display positions 474 include an instance of the feature trigger symbol 420. In addition, the processor 204 may determine to award a jackpot prize 414A-414E based on the prize component 424 of an instance of the feature trigger symbol 420. For example, the processor 204 may determine to respectively award the mini, minor, maxi, major, and grand jackpot prizes 414A-414E in response to a particular instance of the feature trigger symbol 420 having a mini, minor, maxi, major, or grand indicia 412A-412E selected for its prize component 424.

For any awarded jackpot prizes 414A-414E, the processor 204 at 634 may update the feature game win meter 459. In particular, the processor 204 may add a credit value of any awarded jackpot prizes to a currently depicted credit value for the feature game win meter 459.

After updating the feature game win meter 459, the processor 204 at 618 may determine whether the feature game has spins remaining. If the feature game has spins remaining, the processor 204 may proceed to 622 in order to further spin reels of the feature game. On the other hand, if there are no spins remaining, the processor may proceed to 620 in order to transfer feature game winnings before returning to 602 to receive another wager on the base game.

Referring now to FIGS. 4A-4F, aspects of an example play of the base game and the feature game are described. FIG. 4A shows an example base game screen 400 with a base game outcome 432 that includes both feature trigger symbols 420 and non-feature trigger symbols 428. The base game screen 400 further depicts current jackpot values 414A-414E. As further shown, the base game outcome 400 does not include a winning combination symbols along payline 402, but does show six (6) instances of the feature trigger symbols 420. In the embodiment depicted, the six (6) instances of the feature trigger symbol 420 is sufficient to cause a feature trigger event and initiate the feature game.

FIG. 4B depicts an example feature game initiation screen resulting from the triggering of the feature game as a result of the base game outcome of FIG. 4A. As shown, the field or matrix of display positions have expanded from the 3×5 matrix of the base game screen 400 to the 7×7 matrix of the feature game screen 460. Moreover, each instance of the feature trigger symbol 420 and each instance of the non-feature trigger symbol 420 of the base game outcome 432 is placed in a corresponding feature game display position 474. The base game win meter 456 further shows that 0 credits were awarded during play of the base game as the base game outcome 432 of FIG. 4B had no winning combinations of non-feature trigger symbols 428.

The feature game screen 460 of FIG. 4B further depicts an initial state of the feature game resulting from the base game outcome of FIG. 4A. In particular, the spin indicia 496 depicts that the feature game has been awarded three (3) spins due to the presence of the six (6) instances of the feature trigger symbol 420. The feature game win meter 459 further depicts 250 credits, which is the sum of the prize components 424 of the six (6) instances of the feature trigger symbol 420. Moreover, the non-feature trigger symbols 428 are presented as ghosted, dimmed, or transparent non-feature trigger symbols 428 so as to highlight the feature trigger symbols 420. However, as depicted in FIG. 4C, the non-feature trigger symbols 428, in some embodiments, may be replaced with blank symbols so as to further highlight or otherwise emphasize the feature trigger symbols 420.

FIG. 4D depicts the feature game screen 460 after determining and displaying a feature game outcome, such as by spinning a respective reel for each of the feature game display positions 474 that is without an instance of the feature trigger symbol 420. Spinning the reels has resulted in respective feature game display positions 474 receiving a replacement symbol. As shown, each replacement symbol is either an additional instance of the feature trigger symbol 420 or an additional instance of a non-feature trigger symbol 428 such as, for example, a blank symbol. Of note, the spin indicia 496 remains at three (3) spins despite the spin of the reels. In particular, the processor 204 decreased the spin indicia 496 by one (1) to reflect that one of the initially awarded quantity of spins (e.g., three (3) spins) has been used (See, e.g. 628 of FIG. 6B), but then incremented the spin indicia 496 to the initially awarded quantity of spins (e.g., three (3) spins) due to at least one of the replacement symbols being a feature trigger symbol 420 (See, e.g., 632 of FIG. 6B). The processor 204 may further update the feature game win meter 459 to 650 credits to reflect the accumulated credit value of the prize component 424 for each instance of the feature trigger symbol 420 in the feature game outcome 472.

As further depicted in FIG. 4D, a first instance 420A of the feature trigger symbol 420 includes a directional component 426A that points left to signify that the first instance 420A of the feature trigger symbol 420 is to be propagated to feature game display positions 474 that are positioned left from the first instance 420A of the feature trigger symbol 420. Similarly, a second instance 420B of the feature trigger symbol 420 includes directional components 426B that point left, right, up, and down to respectively signify that the second instance 420B of the feature trigger symbol 420 is to be propagated to feature game display positions 474 that are positioned left, right, up, and down from the second instance 420B of the feature trigger symbol 420.

Figure 4E:
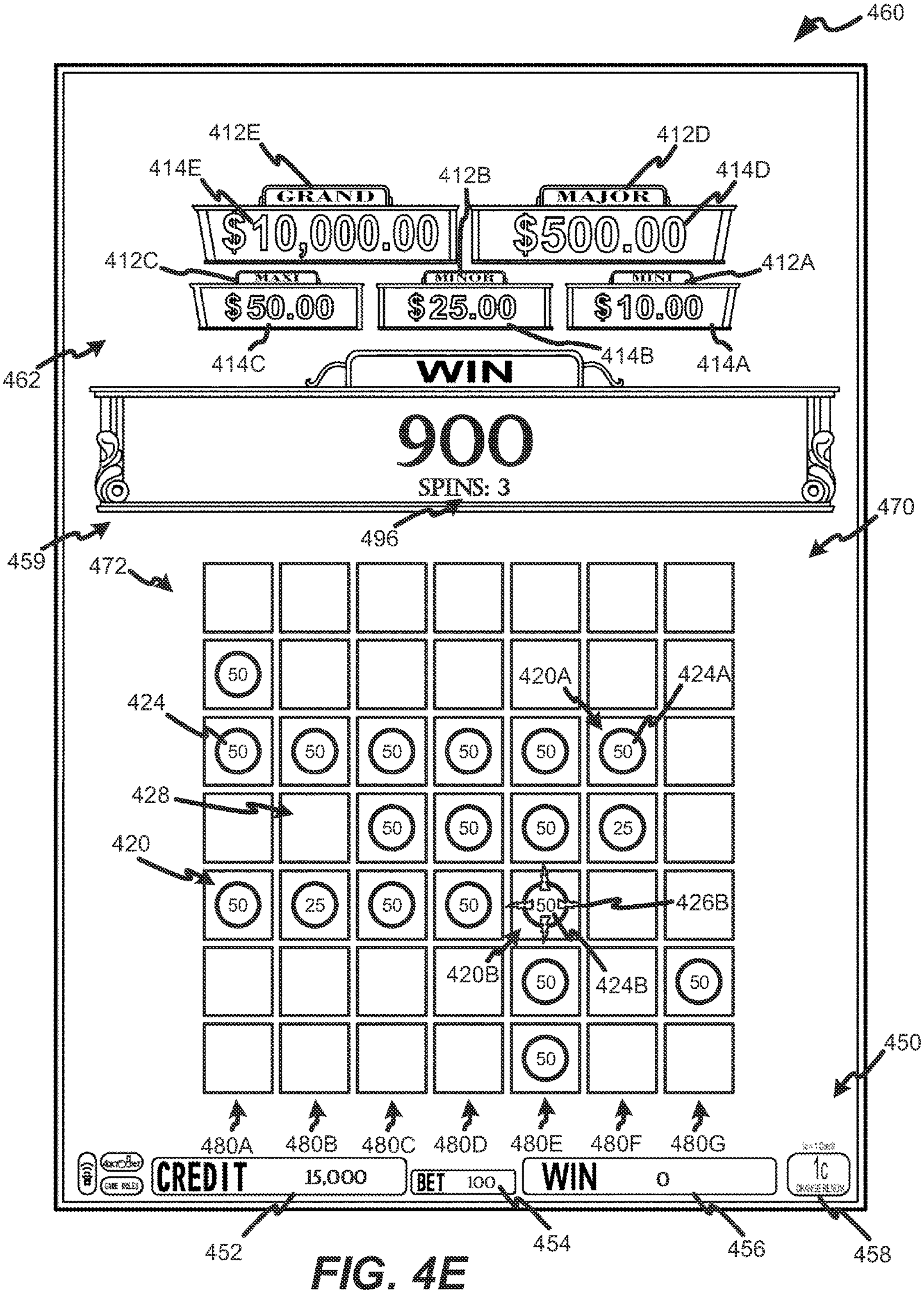

FIG. 4E depicts the feature game screen 460 after the first instance 420A of the feature trigger symbol 420 is propagated left as indicated by its directional component 426A. As shown in FIG. 4D, a consecutive series of five (5) feature game display positions 474 that are without the feature trigger symbol 420 are positioned left of the first instance 420A of the feature trigger symbol 420. As such, the processor 204 propagates the first instance 420A of the feature trigger symbol 420 into this consecutive series of five (5) feature game display positions 474. In particular, the processor 204 places an additional instance of the feature trigger symbol 420 in each of these five (5) feature game display positions 474. Moreover, the processor 204 provides each of the newly-placed feature trigger symbols 420 with a prize component 424 (e.g., 50) that is equal to the prize component 424A of the first instance 420A of the feature trigger symbol 420 being propagated. In some embodiments, the processor 204 may utilize other techniques for providing each instance of the feature trigger symbol 420 with a prize component 424. For example, the processor 204 may provide each instance with a prize component 424 that is randomly selected, that is a predefined fixed value (e.g., 25), that is a random or fixed multiple (e.g., 1/10, 1/2, 2, 10, etc.) of the prize component 424A of the instance 420A, that is a random or fixed multiple (e.g., 1/10, 1/2, 2, 10, etc.) of the placed wager on the base game or a denomination value of the base game, or that is defined by some other technique.

In some embodiments, the processor 204 may utilize various animation techniques to present the propagation of the first instance 420A of the feature trigger symbol 420 to the feature game display positions 474. For example, the processor 204 may cause the display device 240 to present an animation of the directional component 426A moving in the identified direction through the feature game display positions 474 to be updated. Such animation may further highlight the feature game display positions 474 that are to be updated. Moreover, the processor 204 may update the feature game display positions 474 by placing instances of the feature trigger symbol 420 in the feature game display positions 474, one at a time, in sequence starting from the feature game display position 474 adjacent to the first instance 420A of the feature trigger symbol 420 so as to present movement or propagation of the feature trigger symbol 420 in a direction away from the first instance 420A of the feature trigger symbol 420. Other animation techniques for presenting the propagation of the first instance 420A may be used and are contemplated.

As shown in FIG. 4E, the processor 204 may present the first instance 420A of the feature trigger symbol 420 without its directional component 426A after the first instance 420A of the feature trigger symbol 420 is propagated to feature game display positions 474 in a direction as indicated by the directional component 426. In some embodiments, the processor 204 may remove the directional component 426A after the propagation is completed. In other embodiments, the directional component 426A may be removed as part animating the propagation of the first instance 420A of the feature trigger symbol 420. As also shown, the processor 204 may further update the feature game win meter 459 so as to reflect the accumulated credit value (e.g., 900 credits) of the prize component 424 for each instance of the feature trigger symbol 420 in feature game outcome 472.

Figure 4F:
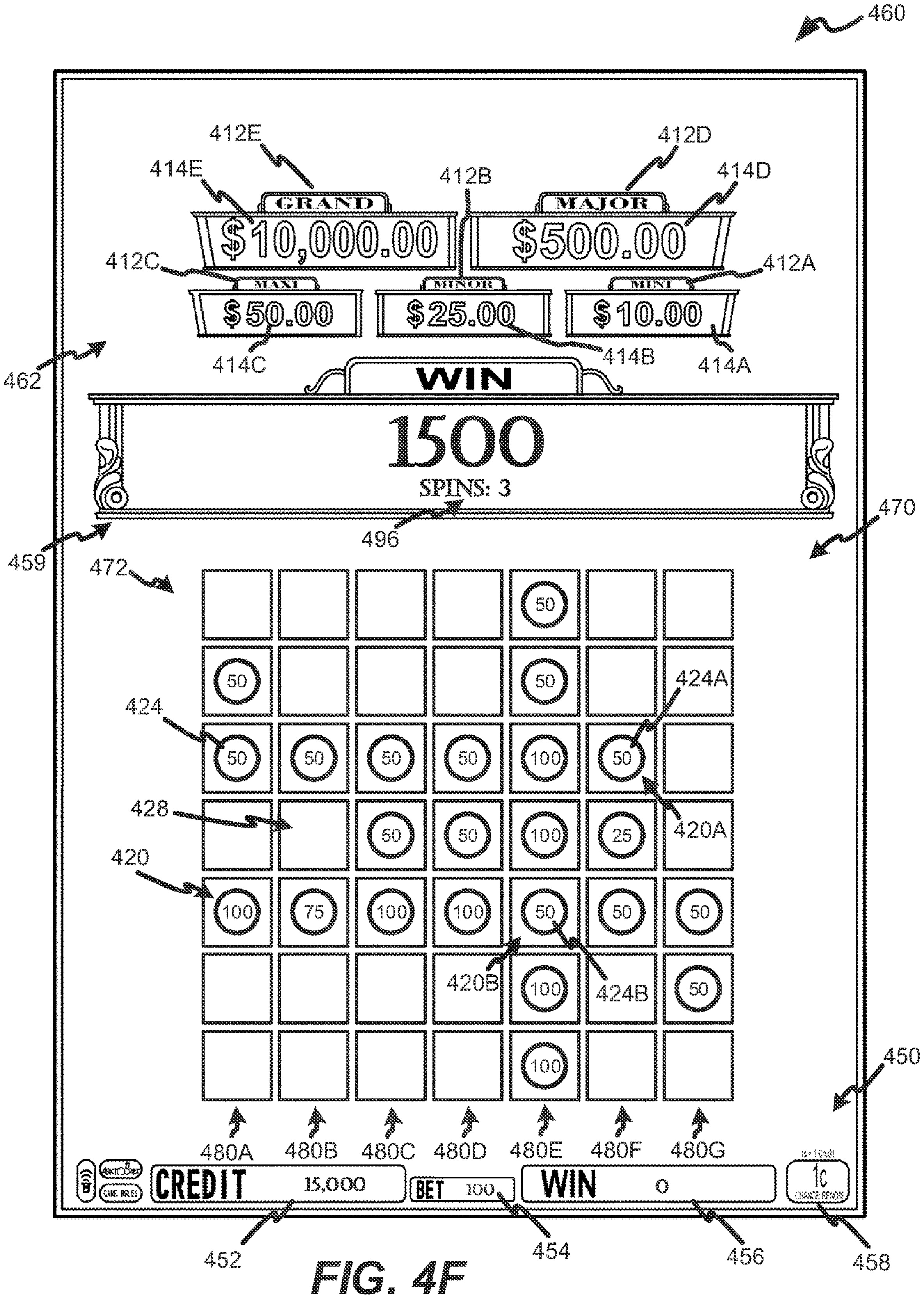

FIG. 4F depicts the feature game screen 460 after the second instance 420B of the feature trigger symbol 420 is propagated left, right, up, and down as indicated by its directional components 426B. As shown in FIG. 4E, feature game display positions 474 that are without the feature trigger symbol 420 are positioned upward of the second instance 420B of the feature trigger symbol 420. Moreover, feature game display positions 474 that are without the feature trigger symbol 420 are also positioned right of the second instance 420B of the feature trigger symbol 420. As such, the processor 204 may propagate the second instance 420B of the feature trigger symbol 420 into these feature game display positions 474 that are without the feature trigger symbol 420. In particular, the processor 204 may place a respective instance of the feature trigger symbol 420 in each of these feature game display positions 474, and may provide each of the placed feature trigger symbols 420 with a prize component 424 (e.g., 50) that is equal to the prize component 424B of the second instance 420B of the feature trigger symbol 420 being propagated. As discussed above, the processor 204, in some embodiments, may utilize other techniques for providing each instance of the feature trigger symbol 420 with a prize component 424.

As further shown in FIG. 4F, feature game display positions 474 that include the feature trigger symbol 420 are positioned in the same row as the second instance 420B of the feature trigger symbol 420, but to the left of the second instance 420B. Moreover, feature game display positions 474 that include the feature trigger symbol 420 are positioned in the same column as the second instance 420B of the feature trigger symbol 420, but positioned upward and downward from the second instance 420B. As such, the processor 204 propagates the second instance 420B of the feature trigger symbol 420 into these occupied feature game display positions 474 by incrementing the respective prize component 424 of each feature trigger symbol 420 occupying such feature trigger display positions 474. In particular, the processor 204 in one embodiment increments the respective prize component 424 by the prize component 424B (e.g., 50) of the second instance 420B being propagated. In some embodiments, the processor 204 may utilize other techniques for incrementing or updating the respective prize components 424. For example, the processor 204 may increment each respective prize component 424 by a randomly selected value. In particular, each prize component 424 may be updated by the same randomly selected increment value or each prize component 424 may be updated by an increment value that was randomly selected for the respective prize component 424. In some embodiments, the processor 204 may increment each prize component 424 by a predefined fixed increment value (e.g., 25), by an increment value that is a random or fixed multiple (e.g., 1/10, 1/2, 2, 10, etc.) of the prize component 424B of the instance 420B, by an increment value that is a random of fixed multiple (e.g., 1/10, 1/2, 2, 10, etc.) of the placed wager on the base game or a denomination value of the base game, or by an increment value specified by some other technique. In some embodiments, the processor 204 may replace each prize component 424 with the value associated with the prize component of the feature trigger symbol 420 having the directional component 426. In certain embodiments, the replacement occurs only if the value of the prize component 424 being replaced is lesser than the new value. In certain embodiments, only certain types of values for the prize components 424 are replaced (e.g., replace all numeric prize components 424 but not prize components 424 with jackpot indicia 212A-212E).

Moreover, in some embodiments, the processor 204 may limit or otherwise cap the prize components 424 to a limit value. Similar to the increment value, the limit value may be a value that is a random or fixed multiple (e.g., 1/10, 1/2, 2, 10, etc.) of the prize component 424B of the instance 420B, a value that is a random of fixed multiple (e.g., 1/10, 1/2, 2, 10, etc.) of the placed wager on the base game or a denomination value of the base game, or a value specified by some other technique. In such an embodiment, the processor 204 may increase the prize components 424 per an increment value, but not beyond the limit value. For example, if the limit value is 200 credits, the processor 204 may set a prize component 424 to the limit value of 200 credits as a result of applying an increment value of 50 credits to a prize component 424 of 175 credits.

As shown in FIG. 4F, the processor 204 may present the second instance 420B of the feature trigger symbol 420 without its directional components 426B after the second instance 420B of the feature trigger symbol 420 is propagated to feature game display positions 474 in directions as indicated by the directional components 426B. In some embodiments, the processor 204 may remove the directional components 426B after the propagation is completed. In other embodiments, the directional components 426B may be removed as part animating the propagation of the second instance 420A of the feature trigger symbol 420. As also shown, the processor 204 may further update the feature game win meter 459 so as to reflect the accumulated credit value (e.g., 1500 credits) of the prize component 424 for each instance of the feature trigger symbol 420.

As shown in the example play-through of FIG. 4A-4F, the processor 204 may propagated an instance of the feature trigger symbol 420 in one or more orthogonal directions (e.g., up, down, left, right) per directional components 426. In some embodiments, the processor 204 may also propagate an instance of the feature trigger symbol in one or more diagonal directions (e.g., up-and-left, up-and-right, down-and-left, down-and-right) per appropriate directional components 426.

As also shown in the example play-through of FIG. 4A-4F, the processor 204 may propagate an instance of the feature trigger symbol 420 fully or completely in one or more orthogonal directions per directional components 426. More specifically, the processor 204 may propagate an instance of the feature trigger symbol 420 to all feature game display positions 474 in the same row and to the left of the instance in response to a directional component 426 pointing to the left. Similarly, the processor 204 may propagate an instance of the feature trigger symbol 420 to all feature game display positions 474 in the same column and upward from the instance in response to a directional component 426 pointing up. However, in some embodiments, the processor 204 may limit the number or distance that the instance of the feature trigger symbol 420 is propagated. For example, in some embodiments, the processor 204 may propagate the instance of the feature trigger symbol 420 only one feature game display position 474 in the direction indicated by its directional component 426. For example, if the directional component 426 points right, the processor 204 may propagate the instance into the feature game display position 474 to the right of the instance and no further. In certain embodiments, the number or distance may be predetermined for each occurrence of the feature trigger symbol 420 with the directional component 426, or randomly determined.

Similarly, the directional component 426 may depict or otherwise indicate the extent of the propagation. For example, the directional component 426 may include a value (e.g., 1, 2, 3) to indicate the number of feature game display positions 474 in the identified direction that instance is to be propagated. In other embodiments, the extent may be depicted by the number of directional components 426 or number of arrow heads of the directional component pointing in the direction of propagation. For example, an instance of the feature trigger symbol 420 may be provided with two directional components pointing up to indicate that the feature trigger symbol 420 is to be propagated to the two feature game display positions 474 above the instance.

Figure 7A:
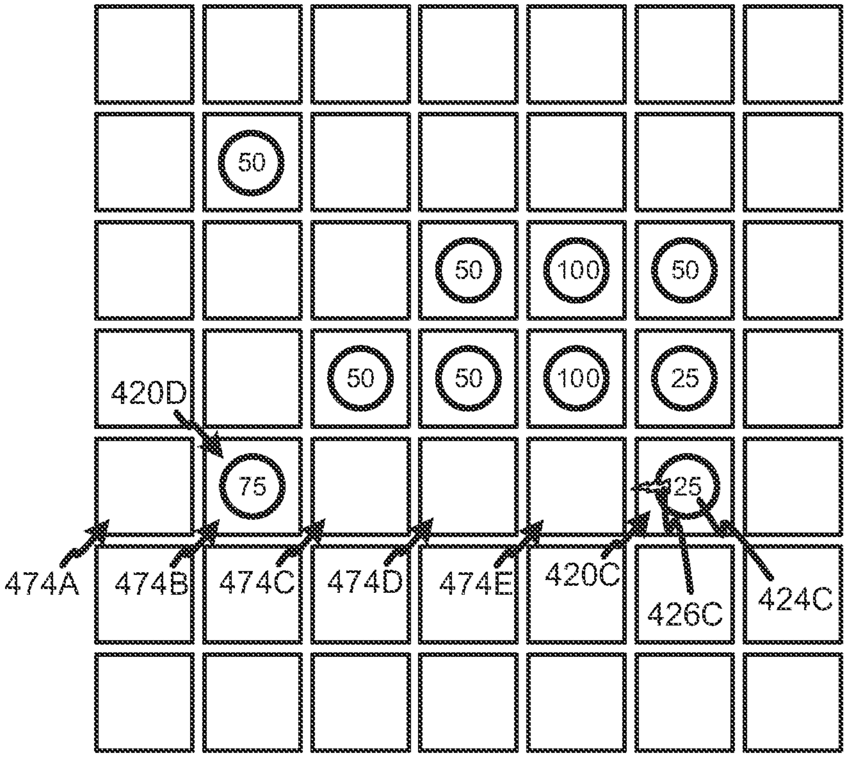
FIGS. 7A and 7B depict aspects of propagating a feature trigger symbol in the presence of a terminating instance of a feature trigger symbol.
Figure 7B:
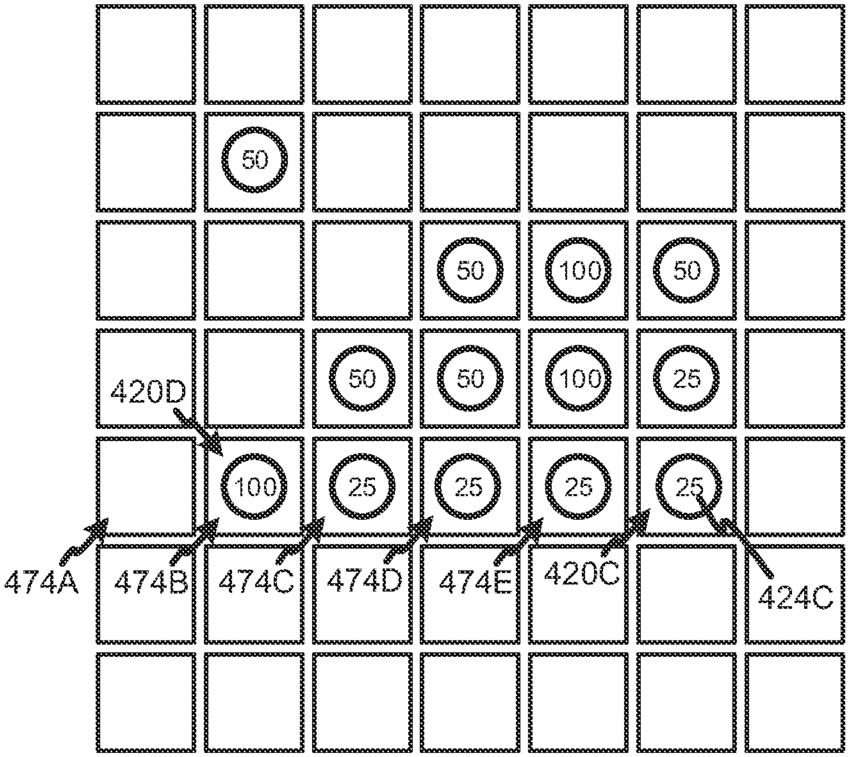

In yet other embodiments, the processor 204 may propagate an instance of a feature trigger symbol 420 in a direction indicated by its directional component 426 until another or terminating instance of the feature trigger symbol 420 is encountered. For example, a consecutive series of three (3) feature game display positions 474C-474E that are without the feature trigger symbol may be positioned left of an instance 420C of the feature trigger symbol 420 to be propagated. See, FIG. 7A. The feature game display position 474B to the left of the series 474C-474E provides a terminating instance of the feature trigger symbol 420 for the series 474C-474E. In response to a directional component 426C of the instance 420C pointing to the left, the processor 204 may place an instance of the feature trigger symbol 420 in each of feature game display position 474C-474E of the series. However, due to the presence of the terminating instance 420D of the feature trigger symbol 420 in the terminating feature game display position 474B, the processor 204 does not place an instance of the feature trigger symbol 420 in feature game display position 474A since it is positioned past the terminating instance 420D as shown in FIG. 7B. As also shown in FIG. 7B, the processor 204 may increment the prize component 424D of the terminating instance 420D by the prize component 424C of the instance 420C being propagated. However, in some embodiments, the processor 204 does not increment the prize component 424 of terminating instances.

Figure 8A:
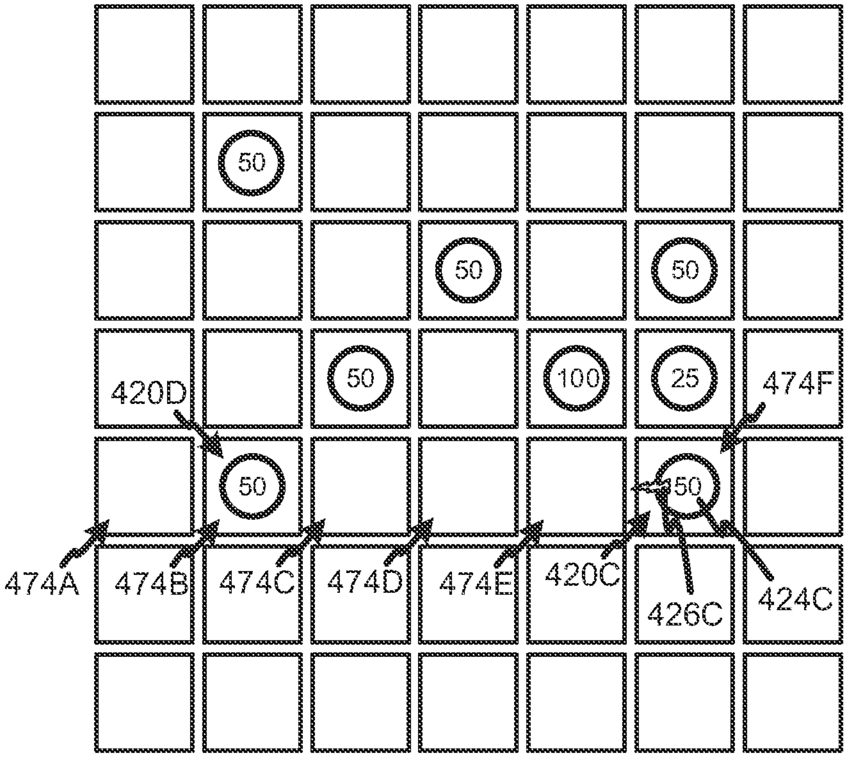
FIGS. 8A and 8B depict aspects of growing a feature trigger symbol in the presence of a terminating instance of a feature trigger symbol.
Figure 8B:
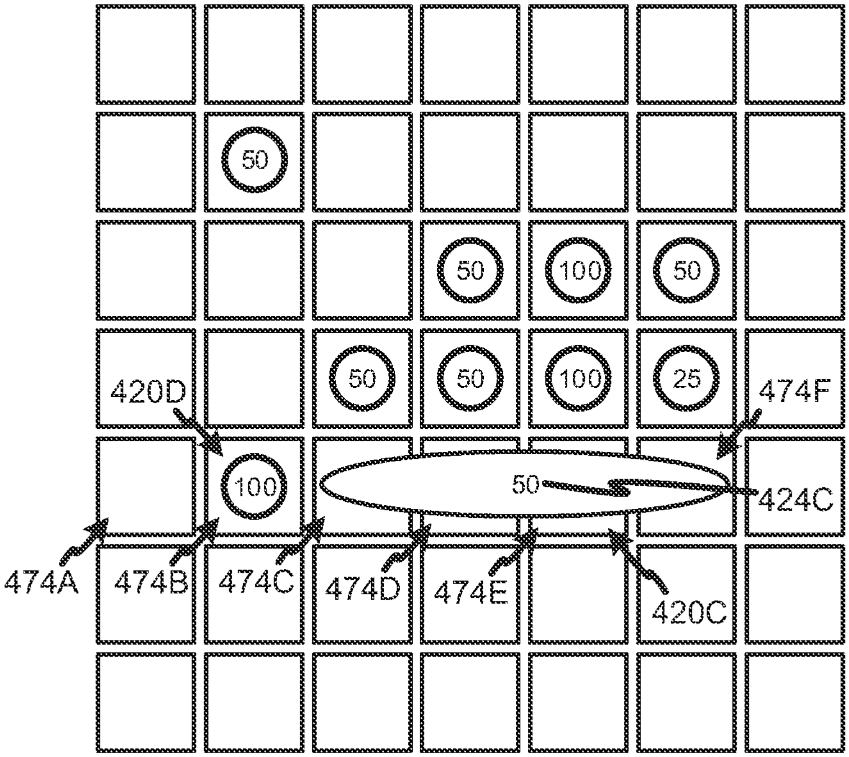

In further embodiments, the processor 204 may propagate an instance of a feature trigger symbol 420 by growing or expanding the feature trigger symbol 420 in a direction indicated by its directional component 426. In such embodiments, the feature trigger symbol 420 may expand until another or terminating instance of the feature trigger symbol 420 is encountered. For example, a consecutive series of three (3) feature game display positions 474C-474E that are without the feature trigger symbol may be positioned left of an instance 420C of the feature trigger symbol 420 to be propagated. See, FIG. 8A. The feature game display position 474B to the left of the series 474C-474E provides a terminating instance of the feature trigger symbol 420 for the series 474C-474E. In response to a directional component 426C of the instance 420C pointing to the left, the processor 204 may expand or grow the feature trigger symbol 420 into each of feature game display position 474C-474E of the series. However, due to the presence of the terminating instance 420D of the feature trigger symbol 420 in the terminating feature game display position 474B, the processor 204 does not place an instance of the feature trigger symbol 420 in feature game display position 474A since it is positioned past the terminating instance 420D as shown in FIG. 8B. As also shown in FIG. 8B, the feature trigger symbol 420 expanded into three additional feature game display positions 474C-474E, but the prize component 424C remained the same. In one embodiment, the prize component 424C applies to each of the four feature game display positions 474C-474F, thus resulting in the expanded feature trigger symbol 420C of FIG. 8B having an effective value of 200 credits (4 times the displayed 50). In some embodiments, the prize component 424C may be displayed at each display position 474C-474C. In other embodiments, the single prized component 424C may be incremented to reflect the effective value. As further shown, the processor 204 may increment the prize component 424D of the terminating instance 420D by the prize component 424C of the instance 420C being propagated. However, in some embodiments, the processor 204 does not increment the prize component 424 of terminating instances.

In certain embodiments, the directional component 426 is not predetermined, but randomly determined for each instance of a feature trigger symbol 420 having a directional component 426 that is selected to be displayed at a feature game display position 474. In other words, processor 204 may determine that an instance of a feature trigger symbol 420 having a directional component 426 is to be displayed at a feature game display position 474. After that determination, a second determination may be made to determine one or more directions to be associated with that instance of the feature trigger symbol 420. In certain embodiments, this second determination may be further broken down into two determinations, a determination for the number of directions and a determination for the direction associated with each of the determined number of directions. Certain embodiments may animate one or more determinations, such as via a rotating arrow or lightning strike and stopping it in the direction selected.

In various embodiments, the (a) quantity of feature trigger symbols required to trigger the feature game, (b) quantity of feature trigger symbols required to award a jackpot, (c) numeric value of the prize component 424, (d) numeric value of the increment value for a prize component 424, and/or (e) prize value of the one or more jackpots may be (i) predetermined, (ii) randomly determined, and/or (iii) based at least in part on one or more of the following (1) wager amount, (2) amount of money wagered over a player session, and/or (3) a player's player account status, etc.

Although the flowchart of FIGS. 6A and 6B shows a specific order of execution, it is understood that the order of execution may differ from that which is depicted. For example, the order of execution of two or more blocks may be scrambled relative to the order shown. Also, two or more blocks shown in succession in FIGS. 6A and 6B may be executed concurrently or with partial concurrency. Further, in some embodiments, one or more of the blocks shown in FIGS. 6A and 6B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A gaming device, comprising:

a display device; and a controller that executes instructions, wherein execution of the instructions causes the controller, in response to receiving a game outcome from a server, to at least:

display symbols at display positions of the display device;

propagate a first instance of a prize symbol in a first direction, wherein propagation of the first instance of the prize symbol displays one or more first additional instances of the prize symbol at one or more first additional display positions in the first direction from the first instance of the prize symbol; and present, via the display device, an award based on prize values associated with the first instance of the prize symbol and the one or more first additional instances of the prize symbol.

2. The gaming device of claim 1, wherein execution of the instructions causes the controller to select the one or more first additional display positions from a subset of display positions that lie in the first direction from the first instance of the prize symbol.

3. The gaming device of claim 1, wherein execution of the instructions causes the controller to present each of the one or more first additional instances of the prize symbol with a respective prize value.

4. The gaming device of claim 1, wherein the one or more first additional display positions include display positions that are without an instance of the prize symbol and in the first direction from the first instance of the prize symbol.

5. The gaming device of claim 1, wherein execution of the instructions causes the controller to increment a respective prize value of an instance of the prize symbol in a display position in the first direction from the first instance of the prize symbol.

6. The gaming device of claim 1, wherein execution of the instructions causes the controller to propagate the first instance of the prize symbol in a second direction, wherein propagation of the first instance of the prize symbol in the second direction displays one or more second additional instances of the prize symbol at one or more second additional display positions in the second direction from the first instance of the prize symbol.

7. The gaming device of claim 1, wherein execution of the instructions causes the controller to:

hold instances of the prize symbol at their respective display positions; and replace symbols at display positions that are without a held instance of the prize symbol.

8. A method of electronic gaming implemented by at least one processor in communication with at least one memory, the method comprising:

generating a game outcome;

providing, via network communication, a gaming device with the game outcome; and causing the gaming device, per the game outcome, to:

display a plurality of symbols at a plurality of display positions of a display device; and propagate a first instance of a prize symbol in a first direction, wherein propagation of the first instance of the prize symbol displays one or more first additional instances of the prize symbol at one or more first additional display positions in the first direction from the first instance of the prize symbol.

9. The method of claim 8, comprising causing the gaming device to present a result based on prize values associated with the first instance of the prize symbol and the one or more first additional instances of the prize symbol.

10. The method of claim 8, wherein the one or more first additional display positions are selected from a subset of display positions that lie in the first direction from the first instance of the prize symbol.

11. The method of claim 8, comprising causing the first instance of the prize symbol to propagate in a second direction and place one or more second additional instances of the prize symbol at one or more second additional display positions in the second direction from the first instance of the prize symbol.

12. The method of claim 11, comprising causing each of the one or more second additional instances of the prize symbol to be presented with a respective prize value.

13. The method of claim 11, comprising causing the one or more second additional display positions to include display positions that are without an instance of the prize symbol and in the second direction from the first instance of the prize symbol.

14. The method of claim 11, comprising a prize value of an instance of the prize symbol in the second direction from the first instance of the prize symbol to be incremented.

15. The method of claim 8, comprises causing respective instances of the prize symbol to be held at their respective display positions, and symbols at display positions that are without a held instance of the prize symbol to be replaced.

16. A non-transitory computer readable storage medium, comprising instructions that, in response to being executed by a server, cause the server to provide a game outcome to a gaming device via one or more network messages that cause the gaming device to propagate a first instance of a prize symbol in a first direction and place one or more first additional instances of the prize symbol at one or more first additional display positions in the first direction from the first instance of the prize symbol.

17. The non-transitory computer readable storage medium of claim 16, wherein execution of the instructions by the server causes an output based on prize values associated with the one or more first additional instances of the prize symbol to be provided.

18. The non-transitory computer readable storage medium of claim 16, wherein execution of the instructions by the server causes the one or more first additional display positions to be selected from a subset of display positions that lie in the first direction from the first instance of the prize symbol.

19. The non-transitory computer readable storage medium of claim 16, wherein execution of the instructions by the server causes the one or more first additional display positions to include display positions that are without an instance of the prize symbol and that are in the first direction from the first instance of the prize symbol.

20. The non-transitory computer readable storage medium of claim 16, wherein execution of the instructions by the server causes the first instance of the prize symbol to propagate in a second direction and place one or more second additional instances of the prize symbol at one or more second additional display positions.

* * * * *